(12) United States Patent
Wang

(10) Patent No.: US 12,440,821 B2
(45) Date of Patent: Oct. 14, 2025

(54) METHOD FOR TRACING SUBTERRANEAN FORMATIONS WITH OIL-SOLUBLE ORGANIC MOLECULAR TRACERS AND EXTRACTING THEM OF FROM OIL PHASES

(71) Applicant: Saudi Arabian Oil Company, Dhahran (SA)

(72) Inventor: Wei Wang, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 975 days.

(21) Appl. No.: 17/549,062

(22) Filed: Dec. 13, 2021

(65) Prior Publication Data

US 2023/0182110 A1 Jun. 15, 2023

(51) Int. Cl.
*G01N 33/28* (2006.01)
*B01J 20/10* (2006.01)
(Continued)

(52) U.S. Cl.
CPC ............ *B01J 20/22* (2013.01); *B01J 20/103* (2013.01); *B01J 20/287* (2013.01); *B01J 20/288* (2013.01);
(Continued)

(58) Field of Classification Search
CPC ... G01N 33/483; G01N 33/241; G01N 21/643
(Continued)

(56) References Cited

U.S. PATENT DOCUMENTS

| | | |
|---|---|---|
| 1,910,489 A | 5/1933 | Lubs et al. |
| 2,033,949 A | 3/1936 | Lubs et al. |

(Continued)

FOREIGN PATENT DOCUMENTS

| | | |
|---|---|---|
| EP | 0171978 | 11/1990 |
| EP | 1721603 | 11/2006 |

(Continued)

OTHER PUBLICATIONS

Namera, A. et al, Journal of Separation Science 2011, 34, 2232-2239. (Year: 2011).*

(Continued)

*Primary Examiner* — Arlen Soderquist
(74) *Attorney, Agent, or Firm* — Fish & Richardson P.C.

(57) ABSTRACT

Functionalized fluorescent tracers, compositions, and methods for extracting the functionalized fluorescent tracers from oil phases and other wellbore or drilling fluids are provided. In some implementations, a sorbent for extracting tracer molecules from a fluid includes a silica-based sorbent. The silica-based sorbent includes a hydrophobic functional group and an ionic functional group. In some implementations, the ionic functional group is positively charged. In some implementations, the ionic functional group is negatively charged. A method of extracting a functionalized dye from an oil phase includes mixing a sorbent for extracting tracer molecules with an oil phase sample that includes a functionalized fluorescent tracer, recovering the sorbent from the oil phase, and dispersing the sorbent in an organic solvent. In some implementations, the method includes lowering the pH of the organic solvent. In some implementations, the method includes raising the pH of the organic solvent.

12 Claims, 16 Drawing Sheets

(51) Int. Cl.
  *B01J 20/22* (2006.01)
  *B01J 20/287* (2006.01)
  *B01J 20/288* (2006.01)
  *C09B 67/54* (2006.01)
  *G01N 21/64* (2006.01)
  *G01N 33/24* (2006.01)

(52) U.S. Cl.
  CPC ....... *C09B 67/0096* (2013.01); *G01N 21/643* (2013.01); *G01N 33/241* (2013.01); *G01N 33/2823* (2013.01)

(58) Field of Classification Search
  USPC .......................................................... 436/27
  See application file for complete search history.

(56) References Cited

U.S. PATENT DOCUMENTS

| | | |
|---|---|---|
| 2,051,218 A | 8/1936 | Magoun et al. |
| 2,061,243 A | 11/1936 | Lubs et al. |
| 2,086,822 A | 7/1937 | Schubert et al. |
| 2,339,621 A | 1/1944 | D'Alelio et al. |
| 2,390,848 A | 12/1945 | Richter |
| 2,455,894 A | 12/1948 | Lecher et al. |
| 2,479,498 A | 8/1949 | Lecher et al. |
| 2,885,421 A | 5/1959 | Spiegler |
| 3,086,962 A | 4/1963 | Mottus |
| 3,103,467 A | 9/1963 | Beaver |
| 3,238,176 A | 3/1966 | Brooks et al. |
| 3,241,971 A | 3/1966 | Kitze |
| 3,281,446 A | 10/1966 | Manning |
| 3,287,136 A | 11/1966 | McBride |
| 3,301,895 A | 1/1967 | Sayigh et al. |
| 3,637,785 A | 1/1972 | Smith et al. |
| 3,637,787 A | 1/1972 | Rasschaert |
| 3,654,214 A | 4/1972 | Beckman |
| 3,655,533 A | 4/1972 | Page |
| 3,953,506 A | 4/1976 | Spicer et al. |
| 3,953,606 A | 4/1976 | Spicer et al. |
| 4,148,799 A | 4/1979 | Enders |
| 4,461,821 A | 7/1984 | Sano et al. |
| 4,772,563 A | 9/1988 | Evangelista et al. |
| 4,921,939 A | 5/1990 | Nofre et al. |
| 5,124,268 A | 6/1992 | Dakubu |
| 5,168,927 A | 12/1992 | Stegenneier |
| 5,498,502 A | 3/1996 | Muramoto et al. |
| 5,677,120 A | 10/1997 | Lushington et al. |
| 6,250,848 B1 | 6/2001 | Moridis et al. |
| 6,331,436 B1 | 12/2001 | Richardson et al. |
| 6,590,647 B2 | 7/2003 | Stephenson |
| 6,691,780 B2 | 2/2004 | Nguyen et al. |
| 7,032,662 B2 | 4/2006 | Malone |
| 7,281,435 B2 | 10/2007 | Sale et al. |
| 7,485,471 B1 | 2/2009 | Sun et al. |
| 7,588,827 B2 | 9/2009 | Nie et al. |
| 7,861,601 B2 | 1/2011 | Sale et al. |
| 7,879,625 B1 | 2/2011 | Boss |
| 8,269,501 B2 | 9/2012 | Schmidt et al. |
| 8,337,783 B2 | 12/2012 | Locascio et al. |
| 8,627,902 B2 | 1/2014 | Hammer |
| 8,638,104 B2 | 1/2014 | Barber et al. |
| 8,877,954 B2 | 11/2014 | Giesenberg et al. |
| 9,034,920 B2 | 5/2015 | Lam et al. |
| 9,080,097 B2 | 7/2015 | Gupta et al. |
| 9,133,709 B2 | 9/2015 | Huh et al. |
| 9,322,056 B2 | 4/2016 | McCann et al. |
| 9,366,099 B2 | 6/2016 | Ly |
| 9,594,070 B2 | 3/2017 | Rule et al. |
| 10,273,399 B2 | 4/2019 | Cox |
| 10,308,865 B2 | 6/2019 | Cox |
| 10,308,895 B2 | 6/2019 | Vidal et al. |
| 10,400,159 B2 | 9/2019 | Gupta |
| 10,487,259 B2 | 11/2019 | Cox |
| 10,927,292 B2 | 2/2021 | Borrell et al. |
| 10,961,443 B2 | 3/2021 | Zhao |
| 10,961,445 B2 | 3/2021 | Ogle et al. |
| 2002/0161051 A1 | 10/2002 | Chow et al. |
| 2003/0220204 A1 | 11/2003 | Baran et al. |
| 2004/0108110 A1 | 6/2004 | Zupanick et al. |
| 2005/0252286 A1 | 11/2005 | Ibrahim et al. |
| 2006/0052374 A1 | 3/2006 | Carroll et al. |
| 2006/0105052 A1 | 5/2006 | Acar et al. |
| 2007/0114030 A1 | 5/2007 | Todd et al. |
| 2008/0110253 A1 | 5/2008 | Stephenson et al. |
| 2008/0111064 A1 | 5/2008 | Andrews et al. |
| 2009/0087911 A1 | 4/2009 | Rogerio |
| 2009/0087912 A1 | 4/2009 | Ramos et al. |
| 2009/0248309 A1 | 10/2009 | Nelville et al. |
| 2009/0277625 A1 | 11/2009 | Bai et al. |
| 2010/0049625 A1 | 2/2010 | Biebesheimer et al. |
| 2010/0092865 A1 | 4/2010 | Kanno et al. |
| 2010/0224823 A1 | 9/2010 | Yin et al. |
| 2010/0307745 A1 | 12/2010 | Lafitte et al. |
| 2011/0012331 A1 | 1/2011 | Kim |
| 2011/0030949 A1 | 2/2011 | Weaver et al. |
| 2011/0207231 A1 | 8/2011 | Natan et al. |
| 2011/0239754 A1 | 10/2011 | Dyer et al. |
| 2011/0257887 A1 | 10/2011 | Cooper et al. |
| 2011/0260051 A1 | 10/2011 | Preudhomme et al. |
| 2011/0275061 A1 | 11/2011 | Weidemaier et al. |
| 2012/0062886 A1 | 3/2012 | Piotti et al. |
| 2012/0115128 A1 | 5/2012 | Miller |
| 2012/0135080 A1 | 5/2012 | Bromberg et al. |
| 2012/0193578 A1 | 8/2012 | Pan et al. |
| 2012/0225274 A1 | 9/2012 | Ishikawa et al. |
| 2012/0257199 A1 | 10/2012 | Liu et al. |
| 2012/0261617 A1 | 10/2012 | Pan et al. |
| 2012/0325465 A1 | 12/2012 | Hammer et al. |
| 2013/0017610 A1 | 1/2013 | Roberts et al. |
| 2013/0040292 A1 | 2/2013 | Lopez et al. |
| 2013/0084643 A1 | 4/2013 | Commarieu et al. |
| 2013/0087329 A1 | 4/2013 | Hewitt et al. |
| 2013/0109261 A1 | 5/2013 | Koene |
| 2013/0244914 A1 | 9/2013 | Wu et al. |
| 2013/0259808 A1 | 10/2013 | Chen et al. |
| 2013/0296453 A1 | 11/2013 | Giesenberg et al. |
| 2013/0312970 A1 | 11/2013 | Lafitte et al. |
| 2013/0341030 A1 | 12/2013 | Brannon et al. |
| 2014/0060832 A1 | 3/2014 | Mahoney et al. |
| 2014/0077121 A1 | 3/2014 | Sun et al. |
| 2014/0120627 A1 | 5/2014 | Rubino et al. |
| 2014/0124196 A1 | 5/2014 | Sunde et al. |
| 2014/0186939 A1 | 7/2014 | Peterman et al. |
| 2014/0190700 A1 | 7/2014 | Tang et al. |
| 2014/0231077 A1 | 8/2014 | Rivero et al. |
| 2014/0260694 A1 | 9/2014 | Szlendak |
| 2014/0323363 A1 | 10/2014 | Perriat |
| 2014/0360973 A1 | 12/2014 | Yin et al. |
| 2015/0013983 A1 | 1/2015 | Alwattari |
| 2015/0038347 A1 | 2/2015 | Johnson et al. |
| 2015/0050741 A1 | 2/2015 | Tour et al. |
| 2015/0079270 A1 | 3/2015 | Wang et al. |
| 2015/0118501 A1 | 4/2015 | Lu |
| 2015/0132543 A1 | 5/2015 | Nouzille et al. |
| 2015/0159079 A1 | 6/2015 | Huh et al. |
| 2015/0218379 A1 | 8/2015 | Gee et al. |
| 2015/0232747 A1 | 8/2015 | Kanj et al. |
| 2015/0268370 A1 | 9/2015 | Johnston et al. |
| 2015/0368547 A1 | 12/2015 | Lesko et al. |
| 2015/0376493 A1 | 12/2015 | Huh et al. |
| 2016/0003040 A1 | 1/2016 | Jessheim et al. |
| 2016/0040514 A1 | 2/2016 | Rahmani et al. |
| 2016/0083641 A1 | 3/2016 | Gamage |
| 2016/0097750 A1 | 4/2016 | Van Herzen et al. |
| 2016/0215030 A1 | 7/2016 | Bressner |
| 2016/0264846 A1 | 9/2016 | Bennetzen et al. |
| 2016/0304934 A1 | 10/2016 | Matsuno |
| 2017/0022804 A1 | 1/2017 | Gupta et al. |
| 2017/0059668 A1 | 3/2017 | Chang et al. |
| 2017/0199124 A1 | 7/2017 | Bolduc et al. |
| 2017/0350236 A1 | 12/2017 | Shen et al. |
| 2017/0361376 A1 | 12/2017 | Murugesan et al. |
| 2018/0171782 A1 | 6/2018 | Cox et al. |
| 2018/0275114 A1 | 9/2018 | Kosynkin et al. |

(56) References Cited

U.S. PATENT DOCUMENTS

| | | |
|---|---|---|
| 2019/0118265 A1 | 4/2019 | Nie et al. |
| 2019/0218907 A1 | 7/2019 | Ow et al. |
| 2019/0226326 A1 | 7/2019 | Ow et al. |
| 2019/0368336 A1 | 12/2019 | Hammond et al. |
| 2019/0382648 A1 | 12/2019 | Murugesan et al. |
| 2021/0025858 A1 | 1/2021 | Ow et al. |
| 2023/0141596 A1 | 5/2023 | Wang et al. |
| 2023/0141819 A1 | 5/2023 | Wang et al. |
| 2023/0144199 A1 | 5/2023 | Wang et al. |
| 2023/0182110 A1 | 6/2023 | Wang et al. |
| 2023/0235218 A1 | 7/2023 | Wang |

FOREIGN PATENT DOCUMENTS

| | | |
|---|---|---|
| EP | 2040075 | 3/2009 |
| EP | 2480625 | 4/2013 |
| EP | 2480626 | 4/2013 |
| GB | 2489714 | 10/2012 |
| JP | 2005524849 | 8/2005 |
| JP | 2007514169 | 5/2007 |
| JP | 2008505259 | 2/2008 |
| JP | 2008524602 | 7/2008 |
| JP | 2009535060 | 10/2009 |
| JP | 2009540326 | 11/2009 |
| JP | 2015523073 | 8/2015 |
| WO | WO 2010138914 | 12/2010 |
| WO | WO 2011035292 | 3/2011 |
| WO | WO 2011035294 | 3/2011 |
| WO | WO 2011063023 | 5/2011 |
| WO | WO 2012154332 | 11/2012 |
| WO | WO 2012158478 | 11/2012 |
| WO | WO 2013142869 | 9/2013 |
| WO | WO 2014014919 | 1/2014 |
| WO | WO 2014066793 | 5/2014 |
| WO | WO 2014096495 | 6/2014 |
| WO | WO 2014207075 | 12/2014 |
| WO | WO 2015044446 | 4/2015 |
| WO | WO 2015058206 | 4/2015 |
| WO | WO 2015097116 | 7/2015 |
| WO | WO 2015200060 | 12/2015 |
| WO | WO 2016087397 | 6/2016 |
| WO | WO 2017011328 | 1/2017 |
| WO | WO 2017136641 | 8/2017 |
| WO | WO 2017164822 | 9/2017 |
| WO | WO 2018085504 | 5/2018 |
| WO | WO 2018175763 | 9/2018 |
| WO | WO 2021092328 | 5/2021 |

OTHER PUBLICATIONS

Wei, J. et al, Journal of Chromatography A 2012, 1246, 129-136. (Year: 2012).*

Li, X. et al, Analyst 2012, 137, 2774-2776. (Year: 2012).*

Wan, Q.-H. et al, Langmuir 2019, 35, 10405-10411. (Year: 2019).*

Kim et al. "Molecular Tripods Showing Fluorescence Enhancement upon Binding to Streptavidin," Org. Lett., 2005, 7(1):111-114, 14 pages.

Lin et al. "Toward live-cell imaging of dopamine neurotransmission with fluorescent neurotransmitter analogues," Chem. Commun., 2015, 51, 14080-14083, 35 pages.

Okuno et al., "Thermoresponsive Carbohydrate-b-Polypeptoid Polymer Vesicles with Selective Solute Permeability and Permeable Factors for Solutes," Biomacromolecules, Jun. 24, 2021, 22, 3099-3106, 20 pages.

Seydack et al., "trans-Stilbene Photochemistry Beyond 500 nm," Journal of Fluorescence, 2000, 10(3), 291-294, 4 pages.

Ahn et al., "Privileged Structure-based Discovery of Novel 2-Iminothiazoles as Protein Tyrosine Phosphatase 1B Inhibitors," Bulletin of the Korean Chemical Society, Oct. 2013, 34(10):2861-2862, 2 pages.

Bock et al., "Sulfide Analogues of Flupirtine and Retigabine with Nanomolar KV7.2/KV7.3 Channel Opening Activity," ChemMedChem, Mar. 2019, 14(9):952-964, 104 pages.

Busschaert et al., "Towards Predictable Transmembrane Transport: QSAR Analysis of Anion Binding and Transport," Chemical Science, May 2013, 4:3036-3045, 11 pages.

Dud et al., "Synthesis of monosubstituted thioureas by vapour digestion and mechanochemical amination of thiocarbamoyl benzotriazoles," Green Chemistry, Mar. 2016, 18(9):2666-2674, 9 pages.

Dyson et al., "The Synthesis of Alkylthiocarbimides and their Thiocarbamide Derivatives by Means of Thiocarbonyl Chloride," Recueil des Travaux Chimiques des Pays-Bas, 1926, 45:421-423, 4 pages.

Janovec et al., "9-Isothiocyanatoanthracene as a Versatile Starting Compound in the Chemistry of Anthracen-9-yl Derivatives," Collect. Czech. Chem. Commun., Apr. 2002, 67(5):665-678, 14 pages.

Jun et al., "Anthracene derivatives bearing thiourea group as fluoride selective fluorescent and colorimetric chemosensors," Tetrahedron Letters, May 2006, 47(18):3103-3106, 4 pages.

Kumavat et al., "Green Synthesis of Symmetrical N, N'-disubstituted Thiourea Derivatives in Water Using Solar Energy," Environmental Chemistry Letters, Jan. 2013, 11:177-182, 6 pages.

Lindahl et al., "Determination of Volatile Amines in Air by Diffusive Sampling, Thiourea Formation and High-Performance Liquid Chromatography," Journal of Chromatography, Jul. 1993, 643(1-1):35-41, 7 pages.

Luo et al., "Synthesis and Biological Evaluation of Arylthiourea Derivatives with Antitubercular Activity," Letters in Drug Design & Discovery, Jul. 2013, 10(7):1-11, 11 pages.

Mayr et al., "A Chiral Thiourea as a Template for Enantioselective Intramolecular [2 + 2] Photocycloaddition Reactions," The Journal of Organic Chemistry, Jun. 2016, 81(16):6965-6971, 80 pages.

Mi et al., "Covalent Binding to Tubulin by Isothiocyanates—A Mechanism of Cell Growth Arrest and Apoptosis," The Journal of Biological Chemistry, Jun. 2008, 283(32):22136-22146, 11 pages.

Techapanalai, "Tetrabromomethane-mediated Desulfurization for Synthesis of Isothiocyanates from Amines," Thesis for the degree of Master of Science in Chemistry, Chulalongkorn University, 2020, 160 pages.

Webbook.nist.gov [online], "1-Aminofluorene," available on or before Jan. 30, 2024, via Internet Archive: Wayback Machine URL <https://webbook.nist.gov/cgi/cbook.cgi?ID=C6344634&Mask=2780#Refs>, retrieved on Jan. 30, 2024, 3 pages.

Webbook.nist.gov [online], "2-Fluorenamine," available on or before Jan. 30, 2024, via Internet Archive: Wayback Machine URL <https://webbook.nist.gov/cgi/cbook.cgi?ID=C153786&Mask=200#Refs>, retrieved on Jan. 30, 2024, 3 pages.

U.S. Appl. No. 17/835,676, Wang, filed Jun. 8, 2022.

Ghanem et al., "Investigation of Fluorescent Dyes as Partitioning Tracers for Subsurface Nonaqueous Phase Liquid (NAPL) Characterization," Journal of Environmental Engineering, Aug. 2003, 5 pages.

Feher et al., "Embedding resorcinarene cavitands in lipid vesicles," New Journal of Chemistry, Jan. 2012, 36(4):874-876, 3 pages.

U.S. Appl. No. 17/454,176, Wang et al, filed Nov. 9, 2021.

U.S. Appl. No. 17/454,181, Wang et al, filed Nov. 9, 2021.

U.S. Appl. No. 17/522,437, Wang et al, filed Nov. 9, 2021.

U.S. Appl. No. 17/522,445, Wang et al, filed Nov. 9, 2021.

U.S. Appl. No. 17/548,837, Wang, filed Dec. 13, 2021.

U.S. Appl. No. 17/548,858, Wang, filed Dec. 13, 2021.

U.S. Appl. No. 17/643,931, Wang, filed Dec. 13, 2021.

Agenet et al., "SPE 157019: Fluorescent Nanobeads: a First Step Toward Intelligent Water Tracers" Society of Petroleum Engineers, SPE International Oilfield Nanotechnology conference, Jun. 12-14, 2012, 13 pages.

Alley et al., "Analysis of Polychlonnated Biphenyls in Fatty Biological Matrixes by On-Line Supercritical Fluid Extraction and Supercritical Fluid Cleanup." Journal of AOAC International 78.4, Jul. 1995, 1051-1054, 4 pages.

Anisimov, "SPE 118862: The Use of Tracers for Reservoir Characterization" Society of petroleum engineers (SPE), presented at SPE Middle East Oil and Gas Show and Conference, Mar. 15-18, 2009, 8 pages.

(56) References Cited

OTHER PUBLICATIONS

Armelao et al., "Design of luminescent lanthanide complexes: From molecules to highly efficient photo-emitting materials" Coordination Chemistry Reviews, vol. 254, 5-6, Mar. 2010, 19 pages.

Aslan et al., "Fluorescent Core—Shell AG@$SiO_2$ Nanocomposites for Metal-Enhanced Fluorescence and Single Nanoparticle Sensing Platforms" Jan. 19, 2007, 2 pages.

Badgett et al., "Totalsynthese eines Neobetanidin-Derivates und des Neobetenamins" Helvetica Chimica Acta, 1970, 53(2): 433-448, 16 pages (English Abstract).

Bagaria et al., "Iron Oxide Nanoparticles Grafted with Sulfonated Copolymers are Stable in Concentrated Brine at Elevated Temperatures and Weakly Adsorb on Silica" ACS Applied Materials & Interfaces, vol. 5, No. 8, Mar. 25, 2013, 3329-3339, 11 pages.

Bala et al., "Interaction of Different Metal Ions with Carboxylic Acid Group: A Quantitative Study" The Journal of Physical Chemistry A, vol. 111, No. 28, Jun. 2007, 6183-6190, 8 pages.

Bao et al., "Luminescence properties of the co-luminescence groups of Sm—La-pyridyl carboxylic acids" Journal of Rare Earths, 30(4), Apr. 2012, 320-324, 5 pages.

Blachier et al., "Adsorption of polyamine on clay minerals" Journal of Colloid and Interface Science, 336, Aug. 2009, 599-606, 8 pages.

Borrini et al., "Water Soluble PDCA Derivatives for Selective Ln(III)/An(III) and Am(III)/Cm(III) Separation" Solvent Extraction and Ion Exchange, 33(3), Oct. 2014, 224-235, 30 pages.

Brichart et al., "The Use of Fluorescent Tracers for Inhibitor Concentration Monitoring Useful for Scale Inhibitor" International Petroleum Technology Conference, IPTC-17933-MS, presented at the International Petroleum Technology Conference held in Kuala Lumpur, Malaysia, Dec. 10-12, 2014, 8 pages.

Bunzil et al., "Taking advantage of luminescent lanthanide ions" Chemical Society Reviews, Dec. 2005, 29 pages.

Cao et al., "Solute reactive tracers for hydrogeological applications: A short review and future prospects." Water 12.3, Mar. 2020, 21 pages.

Chang et al., "Magnetic SERS Composite Nanoparticles for Microfluidic Detection" 251st ACE National Meeting, Mar. 13-17, 2016, 1 page.

Chemspider.com [online], "Structure Search" Mar. 2008, [retrieved on Feb. 15, 2022], retrieved from : URL <http://www.chemspider.com/structuresearch.aspx>, 1 page.

Chen et al., "Aggregation Kinetics of Alginate-Coated Hematite Nanoparticles in Monovalent and Divalent Electrolytes" Environmental Science & Technology, vol. 40, No. 5, Mar. 2006, 1516-1523, 9 pages.

Chen et al., "Analysis of the solution conformations of T4 lysozyme by paramagnetic NMR spectroscopy" Physical Chemistry Chemical Physics, 2016, 18(8), 5850-5859, 10 pages.

Chen et al., "Impact of Irreversible Retention on Tracer Deployments; Constraining Novel Material Deployments" SPE 188890-MS, in SPE Abu Dhabi International Petroleum Exhibition and Conference, Society of Petroleum Engineers, Nov. 2017, 8 pages.

Chen et al., "Improved Reservoir History Matching and Prudction Optimization with Tracer Data" SPE 191523-MS, in SPE Annual Technical Conference and Exhibition, Society of Petroleum Engineers, Sep. 2018, 15 pages.

Chen et al., "Upconversion Nanoparticles: Design, Nanochemistry, and Applications in Theranostics" Chem. Rev, 114(10), Mar. 2014, 5161-5214, 54 pages.

Chen et al., "FITC functionalized magnetic core-shell $Fe_3O_4$/Ag hybrid nanoparticle for selective determination of molecular biothiols" Elsevier Ltd., Dec. 2013, 7 pages.

Chen et al.; "Hydration Repulsion between Carbohydrate Surfaces Mediated by Temperature and Specific Ions" Scientific Reports, vol. 6, Jun. 23, 2016, 10 pages.

Cheraghian, "Application of nano-particles of clay to improve drilling fluid" Int. J. Nanosci. Nanotechnol., 13, Jun. 2017, 177-186, 10 pages.

Chuang et al., "Ultra-sensitive in-situ detection of novel near-infrared persistent luminescent tracer nanoagents in crude oil-water mixtures" a natureresearch journal, Scientific Reports, Jun. 15, 2016, 5 pages.

Coates et al., "Enhancement of luminescence of europium(m) ions in water by use of synergistic chelation. Part 1.1 : 1 and 2 : 1 complexes" J. Chem. Soc, Perkin Trans., Jan. 1996, 1275-1282, 8 pages.

Cole et al.; "Polyethylene Glycol Modified, Cross-Linked Starch-Coated Iron Oxide Nanoparticles for Enhanced Magnetic tumor Targeting" Biomaterials, vol. 32, No. 8, Mar. 1, 2011, 2183-2193, 11 pages.

Cox et al., "Pyrolyzable Nanoparticle Tracers for Environmental Interrogation and Monitoring" ACS Appl. Mater. Interfaces, 2017, 9(15), 13111-13120, 10 pages.

Cubillos et al., "SPE 174394-MS: The Value of Inter-well and Single Well Tracer Technology for De-Risking and Optimizing a CEOR Process—Caracara Field Case" Society of Petroleum Engineers (SPE), presented at EUROPEC 2015, Jun. 1-4, 2015, 19 pages.

Das et al., "Molecular Fluorescence, Phosphorescence, and Chemiluminescence Spectrometry" Analytical Chemistry, Nov. 3, 2011, 29 pages.

Deans, "SPE 7076: Using Chemical Tracers To Measure Fractional Flow And Saturation In-Situ" Society of Petroleum Engineers (SPE), presented at SPE Symposium on improved Methods of Oil Recovery, Apr. 16-17, 1978, 10 pages.

Deschamps et al., "Drilling to the Extreme: the Micro-Coring Bit Concept" IADC/SPE 115187, presented at the IADC/SPE Asai Pacific Drilling Technology Conference and Exhibition, Aug. 25-27, 2008, 12 pages.

Desmette et al., "Drilling Hard and Abrasive Rock Efficiently, or Generating Quality Cuttings? You No. Longer Have to Choose . . ." SPE 116554, Society of Petroleum Engineers, 2008 SPE Annual Technical Conference and Exhibition, Sep. 21-24, 2008, 19 pages.

Du et al., "SPE 93140: Interwell Tracer Tests: Lessons Learnted from past Field Studies" Society of Petroleum Engineers (SPE), presented at SPE Asia Pacific Oil and Gas Conference and Exhibition, Apr. 5-7, 2005, 9 pages.

Dugstad, "Chapter 6: Well-to-well tracer tests" in Petroleum Engineering Handbook, 2007, 651-683, 31 pages.

Dung et al., "Structural and magnetic properties of starch coated magnetite nanoparticles" Journal of Experimental Nanoscience, 4, Sep. 2009, 259-267, 9 pages.

Edwards et al., "Extending the distance range accessed with continuous wave EPR with Gd3+ spin probes at high magnetic fields" Physical Chemistry Chemical Physics, 15(27), 2013, 11313-11326, 14 pages.

El-Aneed et al., "Mass Spectrometry, Review of the Basics: Electrospray, MALDI, and Commonly Used Mass Analyzers" Applied Spectroscopy Reviews, Mar. 16, 2009, 22 pages.

Fichtel et al., "A highly sensitive HPLC method for determination of nanomolar concentrations of dipicolinic acid, a characteristic constituent of bacterial endospores" Journal of Microbiological Methods, 2007, 70, 319-327, 9 pages.

Flury et al., "Dyes as tracers for vadose zone hydrology." Reviews of Geophysics 41.1, Mar. 2003, 37 pages.

Freeze and Cherry, "Chapter 9: Groundwater Contamination" in Groundwater, Englewood Cliffs, NJ: Prentice-Hall, Inc., 1979, 80 pages.

Galdiga and Greibrokk, "Ultra-trace determination of flurinated aromatic carboxylic acids in aqueous reservoir fluids using solid-phase extraction in combination with gas chromatography-mass spectrometry" Journal of Chromatography, vol. 793, Issue 2, Apr. 1997, 297-306, 10 pages.

Gao et al., "A Surface Functional Monomer-Directing Strategy for Highly Dense Imprinting of TNT at Surface of Silica Nanoparticles" Journal of American Chemical Society, vol. 129, No. 25, Jun. 2007, 7859-7866, 8 pages.

Gardiner et al., "Practical Raman Spectroscopy" Springer-Verlag, 1989, 9 pages.

(56) References Cited

OTHER PUBLICATIONS

Ge et al., "Fluorescence modified chitosan coated magnetic nanoparticles for high-efficienct cellular imaging" Nanoscale Res. Lett, 4, Jan. 2009, 287-295, 9 pages.
George et al., "Modified Dipicolinic Acid Ligands for Sensitation and Europium (III) Luminescence" Inorganic Chemistry, vol. 45, No. 4, Feb. 1, 2006, 6 pages.
Georgi, et al., "Advances in Cuttings Collection and Analysis" SPWLA 34th Annual Logging Symposium, Jun. 13-16, 1993, 20 pages.
Gordon-Grossman et al., "W-Band pulse EPR distance measurements in peptides using Gd3+– dipicolinic acid derivatives as spin labels" Physical Chemistry Chemical Physics, 13(22), 2011, 10771-10780, 10 pages.
Grutzke et al., "Heptacoordinate Heteroleptic Salan (ONNO) and Thiosalan (OSSO) Titanium(IV) Complexes: Investigation of Stability and Cytotoxicity" Inorganic Chemistry 54(14), Jul. 2015, 6697-6706, 10 pages.
Hagoot, "The response of interwell tracer tests in watered-out reservoirs" SPE 11131-MS, in SPE Annual Technical Conference and Exhibition, Society of Petroleum Engineers, Jan. 1982, 21 pages.
Han et al., "Application of Silver-Coated Magnetic Microspheres to a SERS-Based Optofluidic Sensor" The Journal of Physical Chemistry (JPCC), Mar. 7, 2011, 7 pages.
Hardy et al., "A novel fluorescent tracer for real-time tracing of clay transport over soil surfaces" Catena, 141, Jun. 2016, 39-45, 7 pages.
He et al., "Luminescent Europium Chelates Synthesis and Fluorescence Properties" Sensors and Materials (2007), 19(2), 123-132, 10 pages.
Hindle et al., "Dipicolinic acid (DPA) assay revisited and appraised for spore detection" Analyst, 1999, 124: 1599-1604, 6 pages.
Hu et al., "Smart Liquid SERS Substrates based on $Fe_3O_4$/Au Nanoparticles with Reversibility Tunable Enhancement Factor for Practical Quantitative Detection" a natureresearch journal, Scientific Reports, Nov. 27, 2014, 10 pages.
Huseby et al., "Assessing EOR potential from partitioning tracer data" SPE 172808-MS, in SPE Middle East Oil and Gas Show and Conference, Society of Petroleum Engineers, Mar. 2015, 15 pages.
Huseby et al., "SPE-169183-MS: High Quality Flow Information from Tracer Data" Society of Petroleum Engineers (SPE), presented at the SPE Bergen One Day Seminar, Apr. 2, 2014, 9 pages.
Hutchins et al., "SPE-21049: Aqueous Tracers for Oilfield Applications" Society of Petroleum Engineers (SPE), presented at SPE International Symposium on Oilfield Chemistry, Feb. 20-22, 1991, 9 pages.
Invitrogen, "Fluorophores and Their Amine-Reactive Derivatives" Molecular Probs Handbook, A Guide to Fluorescent Probes and Labeling Technologies, 11th Edition, 2010, 88 pages.
Jenkins et al., "Ultratrace Determination of Selected Lanthanides by Luminescence Enhancement" Analytical Chemistry, vol. 68, No. 17, Jan. 1, 1996, 7 pages.
Jun et al., "Multifunctional Silver-Embedded Magnetic Nanoparticles as SERS Nanoprobes and Their Applications" Wiley-VCH Verlag GmbH& Co. KGaA, Weinheim, Jan. 4, 2010, 7 pages.
Kaushik et al., "Gd(III) and Mn(II) complexes for dynamic nuclear polarization: small molecular chelate polarizing agents and applications with site-directed spin labeling of proteins" Physical Chemistry Chemical Physics, 18(39), 2016, 27205-27218, 36 pages.
Khalil et al., "Organic dye for subsea flowline assessment." SPE International Symposium on Oilfield Chemistry. OnePetro, Feb. 1999, 7 pages.
Khan et al., "Optimizing waterflood management in a giant UAE carbonate oil field using simulation-based streamlines" SPE 171777-MS, in Abu Dhabi International Petroleum Exhibition and Conference, Society of Petroleum Engineers, Nov. 10-13, 2014, 9 pages.
Kneipp et al., "Single Molecule Detection Using Surface-Enhanced Raman Scattering (SERS)" Physical Review Letters, American Physical Society vol. 78, No. 9, Mar. 3, 1997, 4 pages.

Kornberger and Thiele, "Experiences with an Efficient Rate-Management Approach for the 8th Tortonian Reservoir in the Vienna Basin" SPE 166393-PA, SPE Reservoir Evaluation and Engineering, vol. 17, No. 2, May 2014, 12 pages.
Kosynkin and Alaskar, "Oil Industry First Interwell Trial of Reservoir Nanoagent Tracers" SPE 181551-MS, in SPE Annual Technical Conference and Exhibition, Society of Petroleum Engineers, Sep. 2016, 15 pages.
Kramer, "Water-Soluble Dendritic Architectures with Carbohydrate Shells for the Templation and Stabilization of Catalytically Active Metal Nanoparticles" published by ACS, Macromolecules, vol. 38, No. 20, Aug. 27, 2005, 8308-8315, 8 pages.
Labbe et al., "Development of metal-chelating inhibitors for the Class II fructose 1,6-bisphosphate (FBP) aldolase" Journal of Inorganic Biochemistry, 112, Jul. 2012, 49-58, 10 pages.
Lachowicz et al., "Biocompatible and fluorescent superparamagnetic iron oxide nanoparticles with superior magnetic properties coates with charged polysaccharide derivatives" Colloids and Surfaces B: Biointerfaces, 2017, 150, 402-407, 18 pages.
Larsen et al., "Efficient Synthesis of 4,7-Diamino Substituted 1,10-Phenanthroline-2,9-dicarboxamides" Organic Letters, vol. 13, No. 13, Jul. 2011, 3546-3548, 3 pages.
Li et al., "An amino-endcapped octadecylsilane silica-based mixed-mode stationary phase for the simultaneous separation of neutral and ionizable components in fixed-dose combinations." Analytical Methods 11.30, 2019, 3898-3909, 12 pages.
Li et al., "Long persistent phosphors—from fundamentals to applications" Chem. Soc. Rev., 45(8), Apr. 2016, 2090-2136, 48 pages.
Li et al., "Magic Angle Spinning NMR Structure Determination of Proteins from Pseudocontact Shifts" Journal of the American Chemical Society, 135(22), May 2013, 8294-8303, 10 pages.
Li et al., "Superparamagnetic Iron Oxide Nanoparticles as MRI contrast agents for Non-invasive Stem Cell Labeling and Tracking" Theranostics, Jul. 2013, 3(8):595-615, 21 pages.
Li et al., "Thiol-ene reaction: a versatile tool in site-specific labelling of proteins with chemically inert tags for paramagnetic NMR" Chemical Communications, Cambridge, United Kingdom, 48(21), 2704-2706, 2012, 18 pages.
Liu et al., "Photostimulated near-infrared persistent luminescence as a new optical read-out from Cr3+-doped LiGa5O8" Scientific Reports 3, Article 1554, Mar. 2013, 9 pages.
Liu et al., "Separation of polyethylene glycols and their fluorescein-labeled compounds depending on the hydrophobic interaction by high-performance liquid chromatography." Journal of Chromatography A 1129.1, Sep. 2006, 61-66, 6 pages.
Lomstein and Jorgensen, "Pre-column liquid chromatographic determination of dipicolinic acid from bacterial endospores" Limnology and Oceanography: Methods, Apr. 2012, 10:4, 227-233, 14 pages.
Mahdavi et al., "Preparation, Characterization, and Application of Polyacrylamide-Polystyrene/Bentonite Nanocomposite as an Effective Immobilizing Adsorbent for Remediation of Soil" Chemistry Select, 5, Apr. 2020, 4538-4547, 12 pages.
Mahmoudi et al., "Superparamagnetic iron oxide nanoparticles development surface modification and applications in chemotherapy" Advanced Drug Delivery Reviews, Jan. 2011, 63, 24-46, 23 pages.
Manna et al., "Complexation behavior of trivalent actinides and lanthanides with 1,10-phenanthroline-2,9-dicarboxylic acid based ligands: insight from density functional theory" Physical Chemistry Chemical Physics, vol. 14, No. 31, Jan. 2012, 11060-11069, 10 pages.
Marais, A., et al. "Time-Resolved Fluorescence for Real-Time Monitoring of Both Scale and Corrosion Inhibitors: A Game-Changing Technique" SPE International Oilfield Scale Conference and Exhibition. OnePetro, May 2016, 11 pages.
Marchetti et al., "Fluorous affinity chromatography for enrichment and determination of perfluoroalkyl substances" Annual Review of Analytical Chemistry vol. 84, Jul. 19, 2012, 8 pages.
Martinez et al., "Polysaccharide-based Nanoparticles for Controlled Release Formulations" The Delivery of Nanoparticles, Published May 2012, 185-222, 40 pages.
Martini et al., "How to Monitor Scale Inhibitor Squeeze using Simple TRF Tracers" Society of Petroleum Engineers, presented at

(56) References Cited

OTHER PUBLICATIONS the SPE International Symposium on Oilfield Chemistry held in the Woodlands, Texas, Apr. 13-15, 2015, 8 pages.

Mcwilliams et al., "Fluorescent surfactants from common dyes-rhodamine B and eosin Y." Pure and Applied Chemistry 92.2, Feb. 2020, 265-274, 15 pages.

Melton et al., "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: A Thermodynamic and Crystallographic Study" Inorganic Chemistry vol. 45 No. 23, Jun. 2006, 9 pages.

Moyner et al., "The Application of Flow Diagnostics for Reservoir Management" Society of Petroleum Engineers (SPE), Apr. 2015, 18 pages.

Muller and Seubert, "Ultra trace determination of fluorobenzoic acids in tap and reservoir water using solid-phase extraction and gas chromatography-mass spectrometry" Journal of Chromatography A, 1260, Oct. 2012, 7 pages.

Nie et al., "Probing Single Molecules and Single Nanoparticles by Surface-Enhanced Raman Scattering" Science, vol. 275, No. 5303, Feb. 1997, 1102-1106, 6 pages.

Ogden et al., "Complexation of Am(III) and Nd(in) by 1,10-Phenanthroli ne-2,9-Di carboxylic Acid" Journal of Solution Chemistry, vol. 42, No. 1, pp. 211-225, 2013, 15 pages.

Ouali et al., "Analysis of Paramagnetic NMR Spectra of Triple-Helical Lanthanide Complexes with 2,6-Dipicolinic Acid Revisited: A New Assignment of Structural Changes and Crystal-Field Effects 25 Years Later" Inorganic Chemistry, 41(6), Feb. 2002, 1436-1445, 10 pages.

Pallenberg et al. "Synthesis and Characterization of Some Copper(I) Phenanthroline Complexes" Inorg. Chem. 1995, 34, 2833-2840, 8 pages.

Park et al., "Application of montmorillonite in bentonite as a pharmaceutical excipient in drug delivery systems" Journal of Pharmaceutical Investigation, 46, May 2016, 363-375, 13 pages.

Parker and Williams, "Getting excited about lanthanide complexation chemistry" Journal of the Chemical Society, Dalton Transactions, vol. 18, 1996, 16 pages.

Parker et al., "Being excited by lanthanide coordination complexes: aqua species, chirality, excited-state chemistry, and exchange dynamics" Chemical Reviews, vol. 102, Issue 6, May 2002, 34 pages.

Petoud et al., "Brilliant SM, Eu, Tb, and Dy Chiral Lanthanide Complexes with Strong Circularly Polarized Luminescence" Journal fo the American Chemical Society (JACS), Dec. 15, 2006, 7 pages.

Potapov et al., "Nanometer-Scale Distance Measurements in Proteins Using Gd3+ Spin Labeling" Journal of the American Chemical Society, 132(26), Jun. 2010, 9040-9048, 9 pages.

Qianming et al., "Bspda Synthesis and its Europium (III) Complexes' Fluorescence" Chemical Industry Times, Jul. 2005, 19(7): 38-41, 4 pages (English Abstract).

Rashdan et al., "Effect of the preparation route, PEG and annealing on the phase stability of Fe3O4 nanoparticles and their magnetic properties" Journal of Experimental Nanoscience, vol. 8, No. 2, 2013, 210-222, 13 pages.

Rovani, "Enhanced Oil Recovery: Aqueous Flow Tracer Measurement" WRI-09-R002, OSTI.Gov, Technical Report, U.S. Department of Energy, Feb. 2009, 1-18, 25 pages.

Rowan et al., "Dynamic Covalent Chemistry" Angewante Chemie International Edition, Mar. 15, 2002, 55 pages.

Sabbatini et al., "Luminescent lanthanide complexes as photochemical supramolecular devices" Coordination Chemistry Reviews, vol. 123, issue 1-2, Feb. 1993, 28 pages.

Saeki et al., "Upper and lower critical solution temperatures in poly (ethylene glycol) solutions" Polymer, vol. 17, No. 8, Aug. 1976, 685-689, 5 pages.

Sammes and Yshioglu, "Modern bioassays using metal chelates as luminescent probes" Natural Product Reports, vol. 31, No. 1, 1996, 28 pages.

Sanni et al., "A field case study of inter-well chemical tracer test" in SPE International Symposium on Oilfield Chemistry, Society of Petroleum Engineers, Apr. 2015, 17 pages.

Sanni et al., "Pushing the envelope of residual oil measurement: A field case study of a new class of inter-well chemical tracers" Journal of Petroleum Science and Engineering, vol. 163, 2018, 19 pages.

Santarelli et al., "Formation Evaluation From Logging on Cuttings" SPE Reservoir Evaluation and Engineering, presented at the 1996 SPE Permian Basin Oil and Gas Recovery Conference, Mar. 27-29, 1996, published Jun. 1998, 7 pages.

Schmidt et al., "Copper dipicolinates as peptidomimetic ligands for the Src SH2 domain" Bioorganic & Medicinal Chemistry Letters, 14(16), 4203-4206, Aug. 2004, 4 pages.

Schmidt et al., "Synthesis of Mono- and Dinuclear Vanadium Complexes and Their Reactivity toward Dehydroperoxidation of Alkyl Hydroperoxides" Inorganic Chemistry 56(3), 2017, 1319-1332, 14 pages.

Selvin et al., "Principles and biophysical applications of lanthanide-based probes" Annual Review of Biophysics and Biomolecular Structure, Jun. 2002, 28 pages.

Serres-Piole et al., "Direct sensitive simultaneous determination of fluorinated benzoic acids in oil reservoir waters by ultra high-performance liquid chromatography-tandem mass spectrometry" Journal of Chromatography A, 1218, Aug. 2011, 6 pages.

Serres-Piole et al., "Water tracers in oilfield applications: Guidelines" Elsevier Ltd., Journal of Science and Engineering, Nov. 2012, 18 pages.

ShamsiJazeyi et al., "Polymer-Coated Nanoparticles for Enhance Oil Recovery" Journal of Applied Polymer Science, vol. 131, No. 15, Aug. 5, 2014, 13 pages.

Shook et al., "SPE 124614: Determining Reservoir Properties and Flood Performance from Tracer Test Analysis" Society of petroleum Engineers (SPE), presented at SPE Annual Technical Conference and Exhibition, Oct. 4-7, 2009, 19 pages.

Silva et al., "Studies on new chemical tracers for determination of residual oil saturation in the inter-well region." SPE Oklahoma City Oil and Gas Symposium. OnePetro, Mar. 2017, 14 pages.

Solomon et al., "Synthesis and Study of Silver Nanoparticles" Journal of Chemical Education vol. 84, No. 2, 2007, 332-325, 4 pages.

Song et al., "SERS-Encoded Nanogapped Plasmonic Nanoparticles: Growth of Metallic Nanoshell by Templating Redox-Active Polymer Brushes" Journal of the American Chemical Society (JACS), Apr. 28, 2014, 4 pages.

Stiles et al., "Surface-Enhanced Raman Spectroscopy" Annual Review of Analytical Chemistry, vol. 1, No. 1, Jul. 2008, 601-626, 29 pages.

Stryer et al., "Diffusion-enhanced fluorescence energy transfer" Annual Review of Biophysics and bioengineering, vol. 11, Issue 1, 1982, 21 pages.

Su et al., "A Dipicolinic Acid Tag for Rigid Lanthanide Tagging of Proteins and Paramagnetic NMR Spectroscopy" Journal of the American Chemical Society, 130(32), Jul. 2008, 10486-10487, 2 pages.

Sýkora et al., "Recent advances in mixed-mode chromatographic stationary phases." Journal of separation science 42.1, Jan. 2019, 89-129, 75 pages.

Takenaka et al., "Effect of fatty acids on the membrane fluidity of cultured chick dorsal root ganglion measured by fluorescence photobleaching recovery." Journal of neurobiology 14.6, Nov. 1983, 457-461, 5 pages.

Tang et al., "Synthesis and fluorescence properties of Tb(III) complexes with pyridine-2,6-dicarboxylic acid derivatives" Journal of Central South University of Technology (English Edition), 15(5), Oct. 2008, 599-605, 7 pages.

Tang et al., "Synthesis of Novel Derivatives of Pyridine-2,6-dicarboxylic Acid" Synthetic Communications: An International Journal for Rapid Communication of Synthetic Organic Chemistry, 36(14), Jun. 2006, 2027-2034, 9 pages.

Tang et al., "Synthesis of Eu(III) and Tb(III) Complexes with Novel Pyridine-2,6-Dicarboxylic Acid Derivatives and Their Fluorescence Properties" Front. Chem. China, 2006, 4:, 408-413, 6 pages.

(56) References Cited

OTHER PUBLICATIONS

Thomas et al., "Deployment and Detection of a Novel Barcoded Advanced Tracers System for the Optimization of Improved Waterflood Recovery in Hydrocarbon Reservoirs" SPE-194872-MS, SPE Middle East Oil and Gas Show and Conference. Society of Petroleum Engineers, 2019, 10 pages.

Tian et al., "Off-Resonant Gold Superstructures as Ultrabright Minimally Invasive Surface-Enhanced Raman Scattering (SERS) Probes" American Chemical Society, Jul. 2015, 7 pages.

Toulhoat, "Experimentation and Modelling of U, Th and Lanthanides Transport in Fissured Rocks: Influence of Complexation" MRS Proceedings, vol. 50, Jan. 1, 1985, 8 pages.

Wahajuddin et al., "Superparamagnetic iron oxide nanoparticles: Magnetic nanoplatforms as drug carriers" International Journal of Nanomedicine, 7, Jul. 2012, 3445-3471, 27 pages.

Wang et al., "The Design and Implementation of a Full Field Inter-Well Tracer Program on a Giant UAE Carbonate Oil Field" in Abu Dhabi International Petroleum Exhibition and Conference, Society of Petroleum Engineers, SPE-177527-MS, Nov. 2015, 8 pages.

Wu et al., "A reusable biosensor chip for SERS-fluorescence dual mode immunoassay" Proc. SPIE 9543, Third International Symposium on Laser Interaction with Matter, 954317, May 4, 2015, 6 pages.

Wu et al., "A SERS-Assisted 3D Barcode Chip for High-Throughput Biosensing" Small Journal vol. 11, No. 23, Jun. 11, 2015, 9 pages.

Xu et al., "Superparamagnetic Photonic Crystals" Adv. Mater., Nov. 2001, 13, 1681-1683, 4 pages.

Xu et al., "Synthesis and Utilization of Monodisperse Superparamagnetic Colloidal Particles for Magnetically Controllable Photonic Crystals" Chem. Mater., 14(3), 2002, 1249-1256, 8 pages.

Xu et al.., "Measurement of two-photon excitation cross sections of molecular fluorophores with data from 690 to 1050 nm" Journal of the Optical Society of America B, Mar. 1996, 11 pages.

Yang et al., "The Co-Luminescence Groups of Sm—La-pyridyl Carboxylic Acids and the Binding Characteristics between Selected Doped Complex and Bovine Serum Albumin" Bulletin of the Korean Chemical Society 33(4), Apr. 20, 2012, 1303-1309, 7 pages.

Yang et al., "Paramagnetic labeling of proteins and pseudocontact shift in structural biology" Chinese Journal of Magnetic Resonance, 2014, 31(2):155-171, 12 pages (English Abstract).

Yu et al., "Adsorption of proteins and nucleic acids on clay minerals and their interactions: A review" Applied Clay Science, 80-81, Aug. 2013, 443-452, 10 pages.

Zamberi et al., "SPE 166005: Improved Reservoir Surveillance Through Injected Tracers In A Saudi Arabian Field: Case Study" Society of Petroleum Engineers (SPE), presented at SPE Reservoir Characterization and Simulation Conference and Exhibition, Sep. 2013, 15 pages.

Zemel, "Chapter 3: Interwell Water Tracers" Tracers in the Oil Field, vol. 43, 1st Edition, Elsevier Science, Jan. 13, 1995, 47 pages.

Zhang et al., "Water adsorption on kaolinite and illite after polyamine adsorption" Journal of Petroleum Science and Engineering, 142, Jun. 2016, 13-20, 8 pages.

Zhao et al., "Chromatographic Separation of Highly Soluble Diamond Nanoparticles Prepared by Polyglycerol Grafting" Angewandte Chemie International Edition, vol. 50, No. 6, Feb. 7, 2011, 1388-1392, 5 pages.

Zheng et al., "Immobilization of Candida rugosa lipase on hydrophobic/ strong cation-exchange functional silica particles for biocatalytic synthesis of phytosterol esters." Bioresource technology 115, Jul. 2012, 141-146, 6 pages.

Zhou et al., "Upconversion luminescent materials: advances and applications" Chem Rev., Jan. 14, 2015, 71 pages.

Amendola et al., "The interaction of fluoride with fluorogenic ureas: an ON/$\wedge$1-OFF-ON/$\wedge$2 response," Journal of the American Chemical Society, 2013, 135, 6345-6355, 11 pages.

Berry et al., "Fluorescent transmembrane anion transporters: shedding light on anionophoric activity in cells," Chemical Science, 2016, 7:5069-5077, 9 pages.

Byrne et al., "Urea and thiourea based anion receptors in solution and on polymer supports," Supramolecular Chemistry, 2018, 30:196-205, 10 pages.

Campbell et al., "p-Methoxyphenylisothiocyanate as a Reagent for the Identification of Amines," Proceedings of the Indiana Academy of Science, 1943, 53:119-121, 3 pages.

Cui et al., "Fluorescent investigation of the interactions between N-(p-chlorophenyl)-N'-(1-naphthyl) thiourea and serum albumin: Synchronous fluorescence determination of serum albumin," Analytica Chimica Acta, 2006, 571:175-183, 9 pages.

Dieke et al., "The acute toxicity of thioureas and related compounds to wild and domestic Norway rats," Journal of Pharmacology and Experimental Therapeutics, 1947, 90:260-270, 11 pages.

Dos Santos et al., "Selective fluorescent sensing of chloride," Supramolecular Chemistry, 2008, 20:407-418, 5 pages.

Dos Santos et al., "Synthesis, Structural and Photophysical Evaluations of Urea Based Fluorescent PET Sensors for Anions, " Tetrahedron Letters, 2007, 48, 3135-3139, 13 pages.

Fesenko et al., "Different pathways in the reaction of N-(tosylmethyl)-substituted ureas, thioureas, and N'-cyanoguanidines with sodium cyanide. Synthesis of α-ureido nitriles, α-ureido amides, and hydantoin imino derivatives," Tetrahedron, 2020, 76(40), 18 pages.

French et al., "Alpha-naphthylisocyanate as a reagent for phenols for aliphatic amines/$\wedge$1," Journal of the American Chemical Society, 1926, 48:1736-1739, 4 pages.

Gomez et al., "Urea vs. thiourea in anion recognition," Organic & Biomolecular Chemistry, 2005, 3:1495-1500, 7 pages.

Gunnlaugsson et al., "Design, synthesis and photophysical studies of simple fluorescent anion PET sensors using charge neutral thiourea receptors," Organic & Biomolecular Chemistry, 2004, 2:1856-1863, 8 pages.

Hacker et al., "Aromatic 2-(Thio)ureidocarboxylic Acids As a New Family of Modulators of Multidrug Resistance-Associated Protein 1: Synthesis, Biological Evaluation, and Structure-Activity Relationships, " Journal of Medicinal Chemistry, 2009, 52:4586-45, 10 pages.

Ikedu et al., "Kinetics of Hydrogen Bonding between Anthracene Urea Derivatives and Anions in the Excited State," The Journal of Physical Chemistry A, 2011, 115:8227-8233, 7 pages.

Kim et al., "Novel Solid-Phase Parallel Synthesis of N-Substituted-2-aminobenzo [d]thiazole Derivatives via Cyclization Reactions of 2-Iodophenyl Thiourea Intermediate Resin," ACS Combinatorial Science, 2013, 15, 29-40, 12 pages.

Kinsella et al., "Synthesis and NMR Binding Studies towards Rational Design of a Series of Electron-Withdrawing Diamide Receptors/Organocatalysts," European Journal of Organic Chemistry, 2011, 1125-1132, 42 pages.

Kwon et al., "Unique hydrogen bonds between 9-anthracenyl hydrogen and anions," Journal of Organic Chemistry, 2004, 69:5155-5157, 3 pages.

Li et al., "A new and efficient solid state synthesis of diaryl thioureas," Synthetic Communications, 2001, 31:781-785, 5 pages.

Lin et al., "A new selective colorimetric and fluorescent sensor for Hg2+ and Cu2+ based on a thiourea featuring a pyrene unit, " Talanta, 2010, 81:1209-1215, 7 pages.

Muller et al., "N,N'-Disubstituted guanidine high potency sweeteners," Journal of Medicinal Chemistry, 1992, 35:740-743, 4 pages.

Nishizawa et al., "Anion recognition by a pyrene derivative with a thiourea function," Analytical Sciences, 1997, 13, supplement, 485-488, 4 pages.

Rahman et al., "Thiourea Derivatives, Simple in Structure but Efficient Enzyme Inhibitors and Mercury Sensors," Molecules, 2021, 26, 16 pages.

Ros-Lis et al., "Signaling Mechanisms in Anion-Responsive Push-Pull Chromophores: The Hydrogen-Bonding, Deprotonation and Anion-Exchange Chemistry of Functionalized Azo Dyes," European Journal of Organic Chemistry 2007, 2449-2458, 10 pages.

Sah, "p-bromo phenyl isothiocyanate as a reagent for the identification of aromatic amines," Journal of the Chinese Chemical Society, 1934, 2:225-228, 5 pages.

(56) References Cited

OTHER PUBLICATIONS

Suter et al., "Alpha-Naphthyl Isothiocyanate as a Reagent for Primary and Secondary Aliphatic Amines," Journal of the American Chemical Society, Jun. 1933, 55:2497-2499, 3 pages.

Wu et al., "Synthesis and biological evaluation of novel anti-hepatitis C virus (HCV) agents: 2-hydroxylphenethyl sulfanyl-oxopyrimidines," Medicinal Chemistry Research, 2017, 26:1388-1396, 9 pages.

Xie et al., "Study on host-guest complexation of anions based on a tripodal naphthylurea derivatives," Journal of the Chemical Society, Perkin Transactions 2, 1999, 2:2751-2754, 5 pages.

Liu et al., "Self-Aggregating Deep Cavitand Acts as a Fluorescence Displacement Sensor for Lysine Methylation," J. Am. Chem. Soc., 2016, 138:10746-10749, 4 pages.

\* cited by examiner

METHOD FOR TRACING SUBTERRANEAN FORMATIONS WITH OIL-SOLUBLE ORGANIC MOLECULAR TRACERS AND EXTRACTING THEM OF FROM OIL PHASES

TECHNICAL FIELD

This document relates to methods and compositions used in tracing fluid flow in oil phases, crude oil, and other wellbore or drilling fluids.

BACKGROUND

Tracer techniques can be a powerful diagnostic tool in numerous scientific disciplines and for technologies in many industrial sectors. Molecular tracers can include water-soluble or oil-soluble compounds. In field tests of oilfields, water-soluble tracers can provide a better understanding of the studied oil reservoir, for example, a better understanding of inter-well connections, connections between layers and heterogeneities. Similarly, oil-soluble tracers can provide information on petroleum products, for example qualitative analysis of the production fluid return from multiple stage completions, either vertical or horizontal completions.

SUMMARY

This disclosure describes functionalized fluorescent tracers, and compositions and methods for extracting the functionalized fluorescent tracers from oil phases, crude oil, and other wellbore or drilling fluids.

In some implementations, a sorbent for extracting tracer molecules from a fluid includes a silica-based sorbent. The silica-based sorbent includes a hydrophobic functional group and an ionic functional group. The ionic functional group is positively charged.

In some implementations, a sorbent for extracting tracer molecules from a fluid includes a silica-based sorbent. The silica-based sorbent includes a hydrophobic functional group and an ionic functional group. The ionic functional group is negatively charged.

In some implementations, a method of extracting a functionalized dye from an oil phase includes dispersing a Type I silica-based sorbent in an oil phase sample that includes a functionalized fluorescent tracer. The functionalized fluorescent tracer includes a fluorescent dye and a hydrophobic functional group. The Type I silica-base sorbent includes a hydrophobic functional group and an ionic functional group. The ionic functional group is positively charged. The method includes mixing the oil phase sample and Type I silica-based sorbent, recovering the sorbent from the oil phase, washing the sorbent, dispersing the washed sorbent in an organic solvent, lowering the pH of the organic solvent to protonate the functionalized fluorescent tracer, and recovering the functionalized fluorescent tracer in the organic solvent.

In some implementations, a method of extracting a functionalized dye from an oil phase includes dispersing a Type II silica-based sorbent in an oil phase sample that includes a functionalized fluorescent tracer. The functionalized fluorescent tracer includes a fluorescent dye and a hydrophobic functional group. The Type II silica-base sorbent includes a hydrophobic functional group and an ionic functional group. The ionic functional group is negatively charged. The method includes mixing the oil phase sample and Type II silica-based sorbent, recovering the sorbent from the oil phase, washing the sorbent, dispersing the washed sorbent in an organic solvent, raising the pH of the organic solvent to deprotonate the functionalized fluorescent tracer, and recovering the functionalized fluorescent tracer in the organic solvent.

In some implementations, a method of tracing fluid flow in a subterranean formation includes mixing a functionalized fluorescent tracer into a fluid to yield a tracer fluid. The functionalized fluorescent tracer includes a fluorescent dye and a hydrophobic functional group, The method includes flowing the tracer fluid into a first subterranean formation, recovering a sample from the first subterranean formation or a second subterranean formation, and extracting the functionalized fluorescent tracer from the sample using a Type I or Type II silica-based sorbent. The Type I silica-based sorbent includes a hydrophobic functional group and an ionic functional group. The ionic functional group is positively charged. The Type II silica-based sorbent includes a hydrophobic functional group and an ionic functional group. The ionic functional group is negatively charged.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are functionalized fluorescent tracers, and compositions and methods for extracting the functionalized fluorescent tracers for oil phases, crude oil, and other wellbore or drilling fluids.

Figure 1:
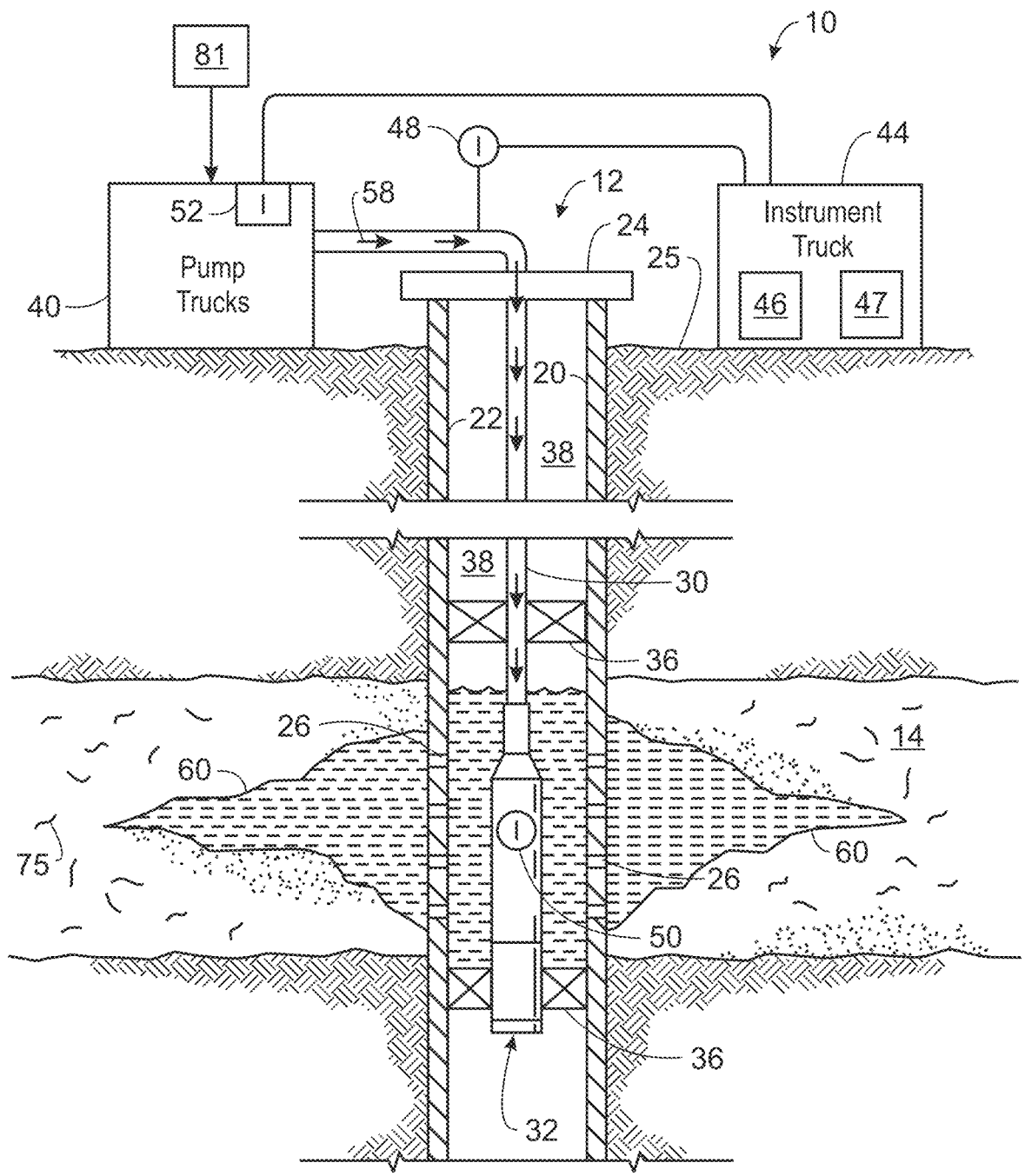
FIG. 1 shows an example of a fracture treatment for a well.

FIG. 1 illustrates an example of a drilling operation 10 for a well 12. The well 12 can be in a wellbore 20 formed in a subterranean zone 14 of a geological formation in the Earth's crust. The subterranean zone 14 can include, for example, a formation, a portion of a formation, or multiple formations in a hydrocarbon-bearing reservoir from which recovery operations can be practiced to recover trapped hydrocarbons. Examples of unconventional reservoirs include tight-gas sands, gas and oil shales, coalbed methane, heavy oil and tar sands, gas-hydrate deposits, to name a few. In some implementations, the subterranean zone 14 includes an underground formation including natural fractures 60 in rock formations containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the wellbore 20. Perforations 26 can be formed in the casing 22 at the level of the subterranean zone 14 to allow oil, gas, and by-products to flow into the well 12 and be produced to the surface 25. Perforations 26 can be formed using shape charges, a perforating gun, or otherwise.

For a drilling treatment 10, a work string 30 can be disposed in the wellbore 20. The work string 30 can be coiled tubing, sectioned pipe, or other suitable tubing. A drilling tool or drill bit 32 can be coupled to an end of the work string 30. Packers 36 can seal an annulus 38 of the wellbore 20 uphole of and downhole of the subterranean zone 14. Packers 36 can be mechanical, fluid inflatable, or other suitable packers.

One or more pump trucks 40 can be coupled to the work string 30 at the surface 25. The pump trucks 40 pump drilling mud 58 down the work string 30 to lubricate and cool the drilling tool or drill bit 32, maintain hydrostatic pressure in the wellbore, and carry subterranean cuttings to the surface. The drilling mud 58 can include a fluid pad, proppants, flush fluid, or a combination of these components. The pump trucks 40 can include mobile vehicles, equipment such as skids, or other suitable structures.

One or more instrument trucks 44 can also be provided at the surface 25. The instrument truck 44 can include a drilling control system 46 and a drilling simulator 47. The drilling control system 46 monitors and controls the drilling treatment 10. The drilling control system 46 can control the pump trucks 40 and fluid valves to stop and start the drilling treatment 10. The drilling control system 46 communicates with surface and subsurface instruments to monitor and control the drilling treatment 10. In some implementations, the surface and subsurface instruments may comprise surface sensors 48, down-hole sensors 50, and pump controls 52.

Additives 81 can be mixed with drilling mud 58 or other drilling fluids and flowed through the reservoir. In some implementations, the additives 81 can include one or more tracers, for example, a fluorescent dye. Fluorescent dyes can be used as water-soluble tracers. These dyes are inexpensive and easy to use. Examples of fluorescent dyes include fluorescein, eosin, Rhodamine, and Rhodamine-B. Advanced water-soluble tracers include fluorinated benzenic acids (FBAs), naphthalene and pyrene based polyaromatic sulfonates, dipicolinic acid (DPA), and phenanthroline-dicarboxylic acid (PDCA) based compounds. However, all of these tracers have some shortcomings. For example, the water-soluble tracers fluorescein, eosin, and Rhodamine can adsorb onto reservoir rock or partition with the oil phase. In oil, these tracers have poor solubility due to their high hydrophilicity, although the molecules may partially dissolve in the oil phase. In addition, the number of tracers is limited to the number of organic dye molecules available.

The tracers described herein overcome these shortcomings. These tracers can be generated using a synthetic method to tune the hydrophilicity/hydrophobicity of water-soluble dye molecules by chemically modifying the molecular structure of the molecule. For example, by covalently grafting functional groups onto the dye molecules, the various functional groups can create barcoded structural information, resulting in new compounds. In some embodiments, by introducing hydrophobic functional groups into water-soluble dye molecules, the hydrophobicity of the resulting molecules can be enhanced, thus improving their solubility in an oil phase. By-tailoring the molecules, the hydrophilicity and hydrophobicity of the molecule can be adjusted to a desired degree. Therefore, the partition of the molecule in an oil phase is controllable. This, in part, enables the potential application of these functionalized fluorescent dyes as partition tracers for oil reservoir applications. The structure-modified dyes reserve their fluorescence properties, although in some implementations the fluorescence features may also be modified by the introduction of functional groups. In some implementations, a fluorinated hydrophobic functional group can be introduced, resulting in dye compounds with low sorption on rock in fluids.

These functionalized fluorescent dyes are described herein as barcoded or having barcode information. In this context, "barcode" refers to the fact that these functionalized dyes or tracers are uniquely identifiable by two or more orthogonal analyses. As a first analysis, the tracers can be identified by their fluorescence signal, for example, by the wavelength of the emission spectrum or simply by the presence of a fluorescent signal. As a second analysis, the tracers can be identified by their mass or hydrophobicity. Accordingly, the unique combinations of the different fluorophores and the different functionalization groups results in a library of barcoded tracers.

Barcoded tracers have several advantages. Different combinations of different tracers can be used simultaneously or in parallel to provide information about drilling operations or subterranean formations. For example, two or more uniquely identifiable tracers can be injected at two or more different drilling sites and can yield information about inter-well connectivity. In another example, uniquely identifiable tracers can be injected at the same drilling site at different times, can yield temporal information about transit time, depth, or length of subterranean fractures or formations.

Further, the two-factor nature of the barcode tracers allows for an advantageous two-factor analysis. The first factor, the fluorescence signal, can be detected in an initial, rapid analysis. Accordingly, samples recovered from a drilling operation or subterranean formation can be quickly and qualitative analyzed for the presence of a fluorescence signal, i.e., a 'yes/no' analysis. In some implementations, this first analysis can be done on-site, and samples exhibiting a fluorescence signal can be allocated for further processing. Next, the samples exhibiting a fluorescence signal can be subsequently analyzed for mass or hydrophobicity, for example by high performance liquid chromatography (HPLC), mass spectrometry, liquid chromatography-mass spectrometry (LC-MS), or pyrolysis gas chromatography-mass spectrometry (Ptrolysis-GC-MS) analysis.

A chemical method to modify the structures of conventional dye molecules by introducing molecular barcode information and by tailoring the hydrophilicity and/or hydrophobicity of the conventional water-soluble dye molecules is described herein. The resulting compounds expand the number of dyes available for tracer applications as water-soluble tracers, oil tracers, or partition tracers.

The tracers described herein are functionalized fluorescent dyes. The dyes are detectable by spectroscopy methods, for example, UV-Visible spectroscopy (UV-Vis), fluorescence, Fourier-transform infrared spectroscopy (FTIR), Raman spectroscopy, mass spectroscopy, or chromatography (HPLC, LC-MS, or Pyrolysis-GC-MS). The functionalized fluorescent dye includes an isothiocyanate functional group. In some implementations, the fluorescent dye is fluorescein isothiocyanate (FITC), Rhodamine B isothiocyanate (RBITC), or tetramethylrhodamine isothiocyanate (TRITC), or any isomer thereof. The structures of FITC, RBITC, and TRITC are shown in Table 1. These dyes are highly water-soluble, i.e., hydrophilic, and have fluorescence emissions in the visible spectral region. The excitation and emission wavelengths of these dyes are listed in Table 1.

TABLE 1

Water-Soluble Dyes and their Molecular Structure

| Dye compound | Molecular structure; Molecular weight (Da) | Fluorescence $\lambda_{excitation}/\lambda_{emission}$ | CAS Number / Isomers |
|---|---|---|---|
| Fluorescein isothiocyanate (FITC) | 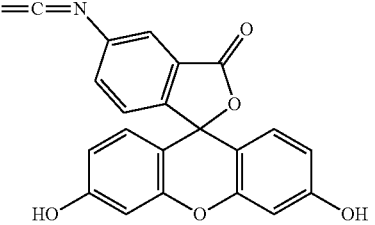<br>MW = 389.38 | 495 nm/519 nm | 27072-45-3 (mixed isomers)<br>3326-32-7 (5-isomer)<br>18861-78-4 (6-isomer) |
| Rhodamine B isothiocyanate (RBITC) | 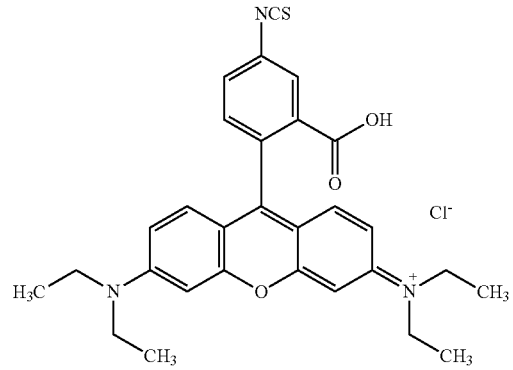<br>MW = 536.08 | 570 nm/595 nm | 36877-69-7 (mixed isomers) |
| Tetramethyl-rhodamine isothiocyanate (TRITC) | 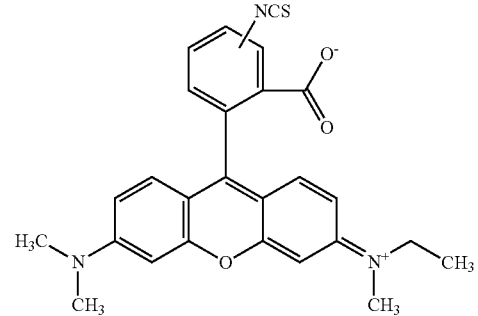<br>MW = 443.52 | 544 nm/570 nm | 95197-95-8 (mixed isomers)<br>80724-20-5 (Isomer R)<br>80724-19-2 (5-TRITC) |

Each of these fluorescent dyes can be functionalized with a hydrophobic functional group. The functional group can include a fatty (alkyl) chain, an aromatic ring, a polycyclic ring, or a heterocyclic ring. The functional groups increase the solubility of the dye in an oil phase and introduce barcoded molecular information into their structures. These functional groups can be ligated to the isothiocyanate-containing dyes by reaction between the isothiocyanate group on the dye and a functional group containing a primary amine to result in a substituted thiourea, as shown in Equation 1.

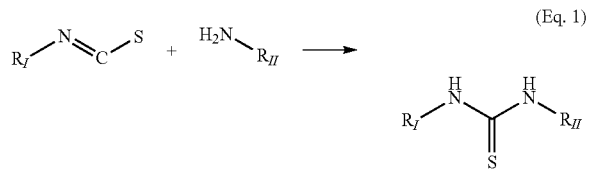

(Eq. 1)

In Equation 1, $R_{II}$ is an alkyl, aromatic, heterocyclic group, or other suitable amine-containing functional group, and $R_I$ is the isothiocyanate-containing fluorescent dye, where in Equation 1 the isothiocyanate group is expanded for clarity.

Figure 2:
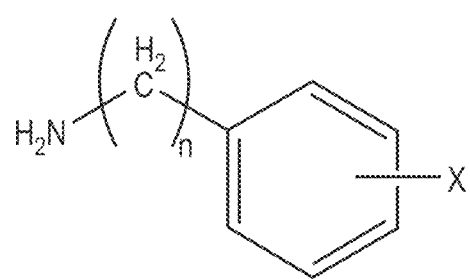
FIG. 2 shows suitable amine-containing functional groups for use in a functionalized fluorescent dye.

Suitable amine-containing functional groups include alkyl chains $NH_2-(CH_2)_n-CH_3$, where n is 0-19. Suitable amine-containing functional groups also include polycyclic aromatic rings, heterocyclic rings, and aromatic rings with a hydrocarbon chain. Additional suitable amine-containing functional groups include the functional groups as shown in FIG. 2, where n=0-12 and X=H, F, Cl, Br, $CH_3$, or $CF_3$. Table 2 shows examples of functionalized isothiocyanate dyes. These dyes are soluble in oil phases, with tunable hydrophobicity based on the choice of functional group.

TABLE 2

Functionalized Isothiocyanate Dyes

| Base dye compound used in synthesis | Structure-modified hydrophobic dye compounds | Functional Group |
|---|---|---|
| Fluorescein isothiocyanate (FITC) MW = 389.38 | [structure of FITC-thiourea with alkyl chain $-(CH_2)_n-CH_3$] | n = 0-19 |
| Fluorescein isothiocyanate (FITC) MW = 389.38 | [structure of FITC-thiourea with Y group] | Y = polycyclic aromatic ring, heterocyclic ring, or aromatic ring with hydrocarbon chain |

TABLE 2-continued

Functionalized Isothiocyanate Dyes

| Base dye compound used in synthesis | Structure-modified hydrophobic dye compounds | Functional Group |
|---|---|---|
| Fluorescein isothiocyanate (FITC) MW = 389.38 | 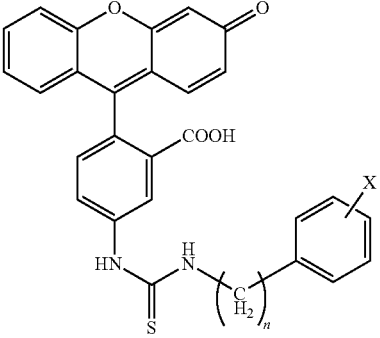 | n = 0-12 X = H, F, Cl, Br, $CH_3$, $CF_3$ |
| Rhodamine B isothiocyanate (RBITC) MW = 536.08 | 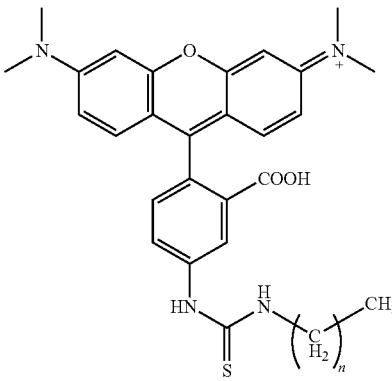 | n = 0-19 |
| Rhodamine B isothiocyanate (RBITC) MW = 536.08 | 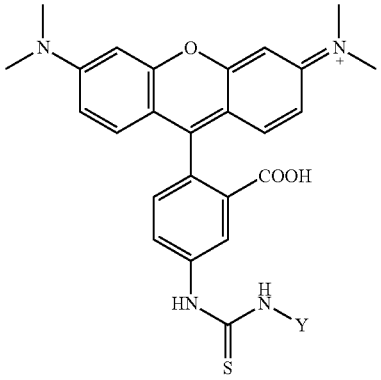 | Y = polycyclic aromatic ring, heterocyclic ring, or aromatic ring with hydro-carbon chain |
| Rhodamine B isothiocyanate (RBITC) MW = 536.08 | 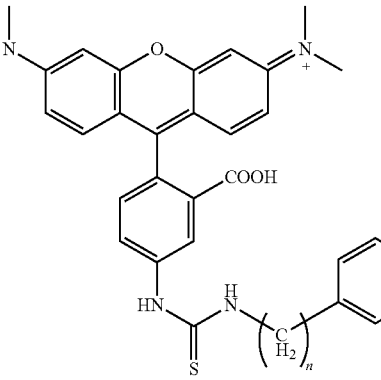 | n = 0-12 X = H, F, Cl, Br, $CH_3$, $CF_3$ |

TABLE 2-continued

Functionalized Isothiocyanate Dyes

| Base dye compound used in synthesis | Structure-modified hydrophobic dye compounds | Functional Group |
|---|---|---|
| Tetramethyl-rhodamine isothiocyanate (TRITC) MW = 443.52 | [structure] | n = 0-19 |
| Tetramethyl-rhodamine isothiocyanate (TRITC) MW = 443.52 | [structure] | Y = polycyclic aromatic ring, heterocyclic ring, or aromatic ring with hydrocarbon chain |
| Tetramethyl-rhodamine isothiocyanate (TRITC) MW = 443.52 | [structure] | n = 0-12 X = H, F, Cl, Br, CH3, CF3 |

When the oil-soluble functionalized dyes shown in Table 2 are used as tracers, it can be difficult to directly detect the tracers in the oil phase, due in part to optical interference from background fluorescence of crude oil, and structural interference from complex components of crude oil or other impurities. Therefore, extracting and purifying the tracer compounds is necessary before an instrumental analysis.

Figure 3A:
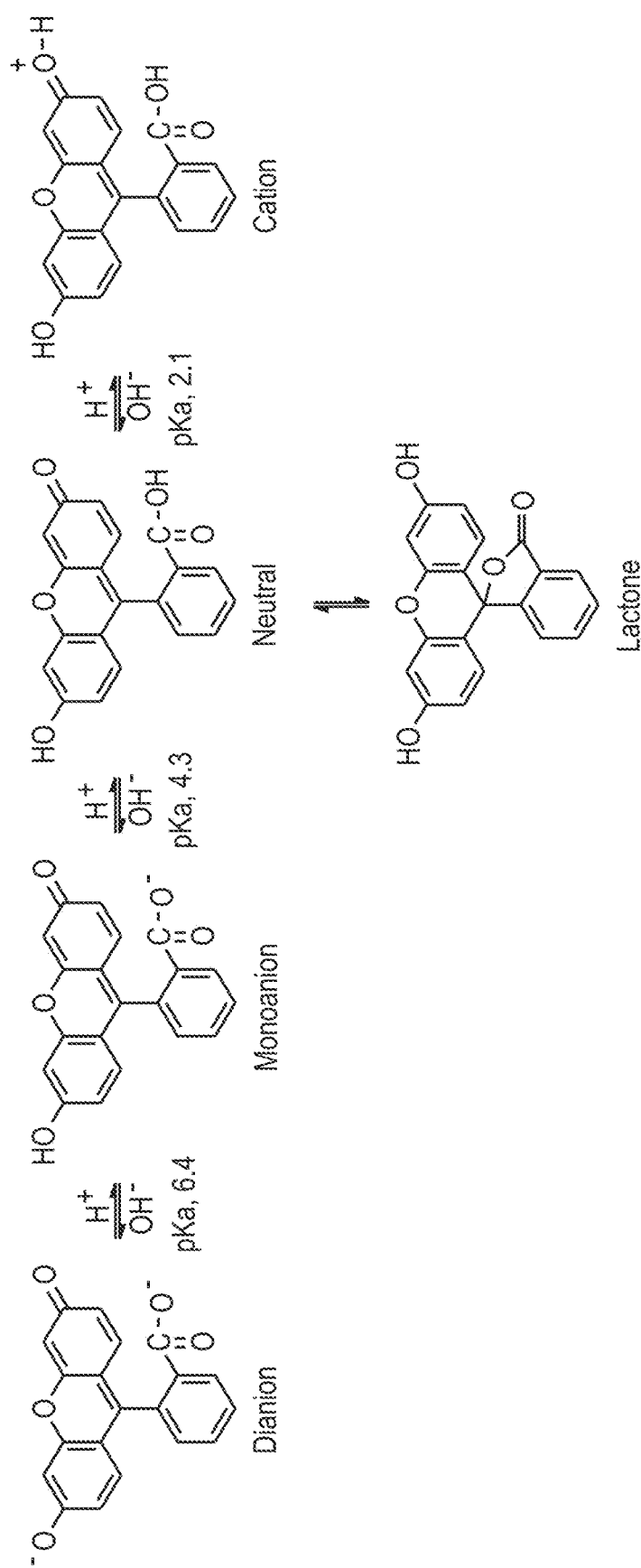
FIG. 3A shows the pH dependence of fluorescein.
Figure 3B:
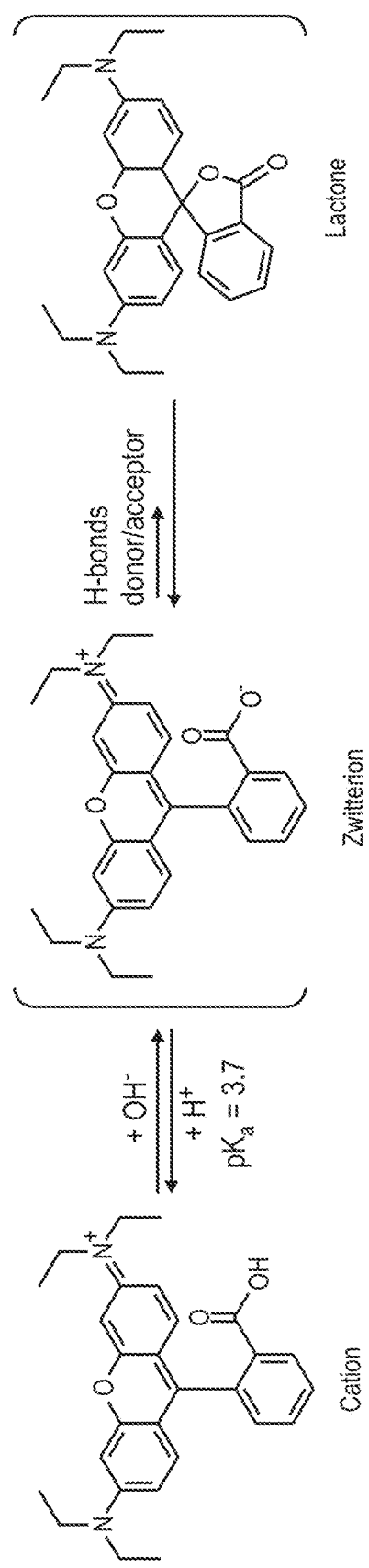
FIG. 3B shows the pH dependence of Rhodamine.
Figure 3C:
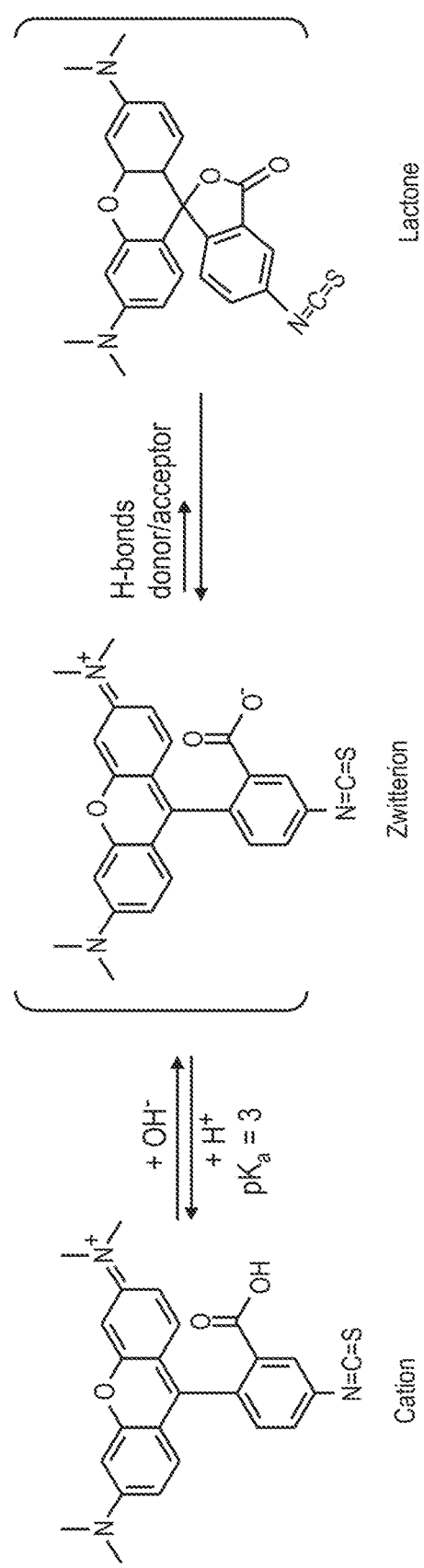
FIG. 3C shows the pH dependence of TRITC.

Described herein is a method to separate and pre-concentrate the oil-soluble tracer compounds from crude oil. The structures of the organic dyes shown in Tables 1 and 2 are pH dependent, as shown in FIGS. 3A and 31B. FIG. 3A shows the pH dependence of fluorescein. At basic pH, fluorescein is negatively charged. At acidic pH<2.1, fluorescein is positively charged. At 2.1<pH<4.3, fluorescein is neutral. At basic pH>6.4, fluorescein is negatively charged. FIG. 3B shows the pH dependence of Rhodamine. At acidic pH<3.7, Rhodamine is positively charged. At pH>3.7, Rhodamine is neutral. FIG. 3C shows the pH dependence of TRITC. At acidic pH<3.1, TRITC is positively charged. At pH>3.1, TRITC is neutral. The pH dependency of these dyes is also present in their isothiocyanate-containing forms (FITC, RBITC, and TRITC). Further, the pH dependency is not affected by the functionalizations shown in Table 2.

Accordingly, by adjusting the pH values of the functionalized tracers in solution, the charges of the molecules can be neutralized or reversed. This property can be used to extract the functionalized dyes from oil phases using a functionalized solid sorbent. The functionalized sorbent includes both hydrophobic functional groups and charged functional groups. The functionalized dyes are attracted to the hydrophobic regions of the functionalized sorbent due in part to the highly hydrophobic functional groups in the functionalized dye. These hydrophobic groups are attracted the hydrophobic regions of the sorbent via non-polar or van der Waals interactions. In addition, the fluorescent dye can have pH dependent ionic interactions with the charged functional groups on the functionalized sorbent.

Figure 4A:
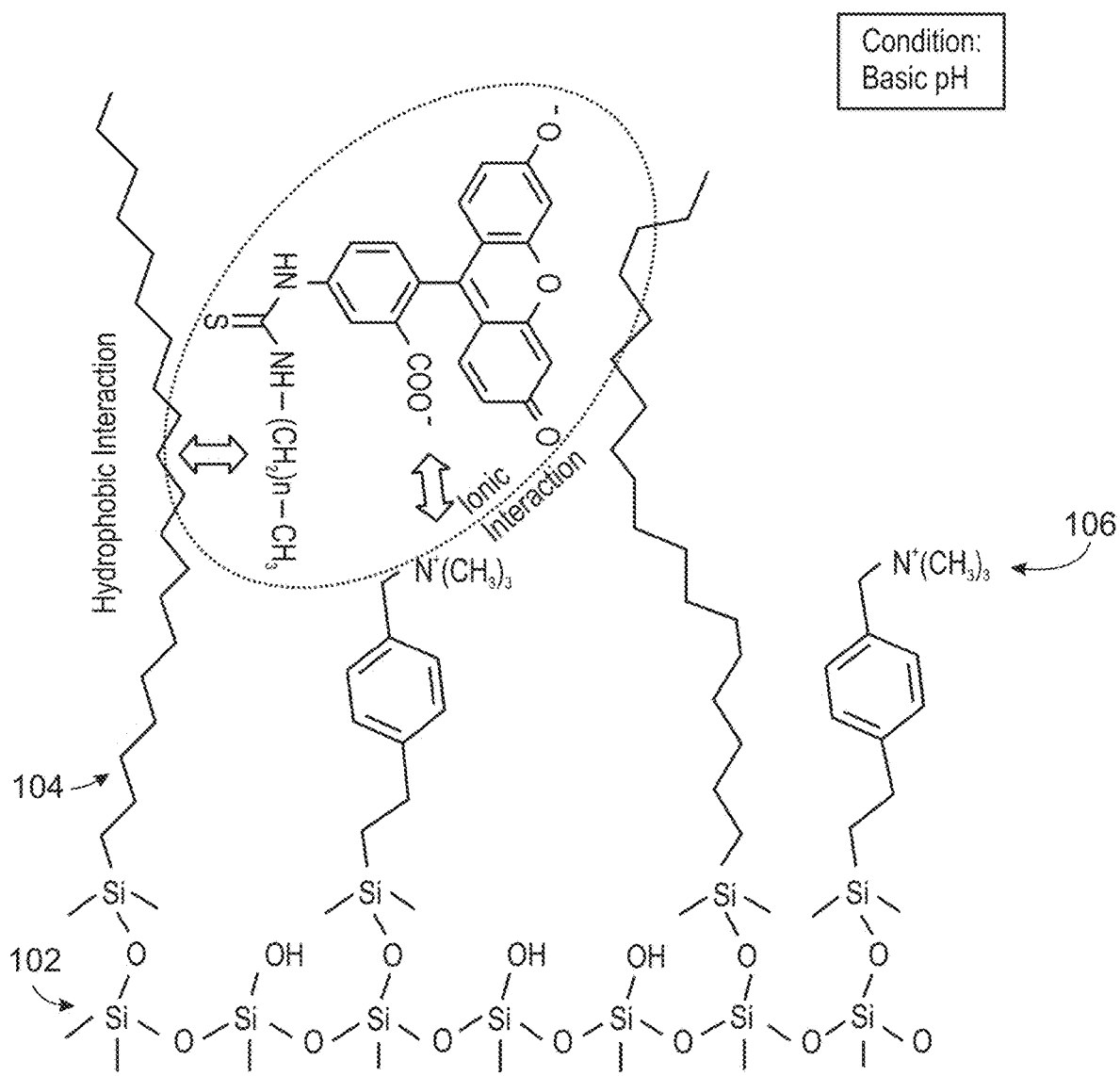
FIG. 4A shows the structure of a "Type I" silica-based sorption material.
Figure 5A:
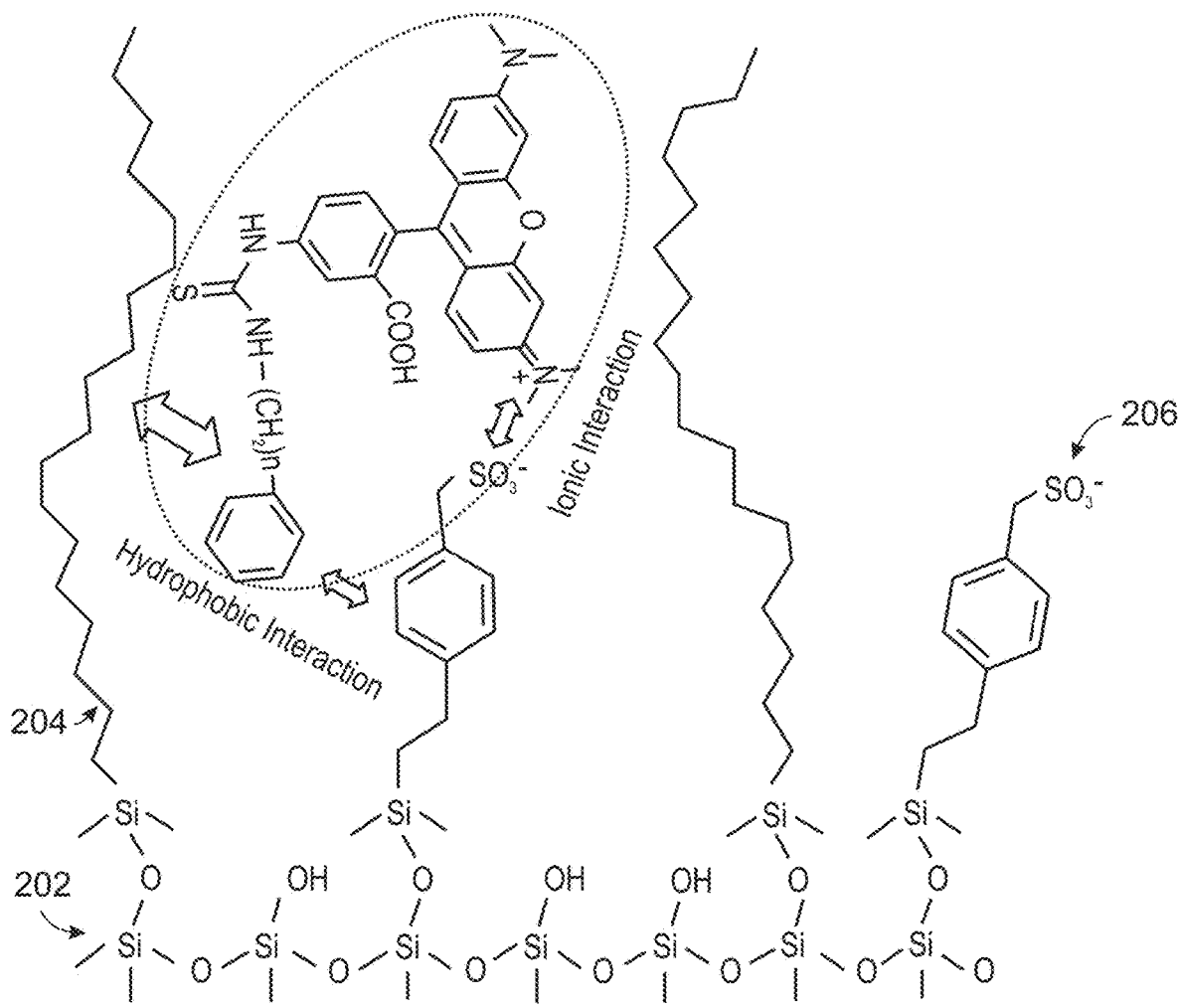
FIG. 5A shows an example of a "Type II" silica-based sorbent.

In some implementations, the functionalized sorbent is a silica-based sorbent. Other sorbents, for example, polymer-based resins, can swell or partially dissolve in an oil phase. In contrast, silica-based sorbents include functionalized silicon dioxide and are stable in oil phases. Accordingly, a modified silica-based ionic sorption material that includes hydrophobic and ionic functional groups can be used to extract functionalized tracers from an oil phase. The hydrophobic and ionic regions of the modified silica-based sorbent work synergistically to enhance the sensitivity and selectivity of the sorption material to the oil-soluble tracer compounds. The structures of two types of silica-based sorption materials are shown in FIGS. 4A and 5A. FIG. 4A shows the structure of a "Type I" silica-based sorption material 100 and the mechanism of interaction with an example functionalized tracer dye. The silica-based sorbent 100 includes a silica base 102 and a hydrophobic region 104, for example, an alkyl chain [—$(CH_2)_n$—$CH_3$, n=7-17] or aromatic functional groups. The Type I silica-based sorbent also includes strong basic anion-exchange properties. In more detail, the Type I silica-based sorbent 100 can include a positively charged ionic functional group 106. In some implementations, the silica-based sorbent can be functionalized with a quaternary amine-containing functional group.

Type I silica-based sorbents can be prepared by reacting tetraethyl orthosilicate with a hydrophobic-containing functional group and an ion-containing functional group. For example, the reaction of tetraethyl orthosilicate, n-octadecyltrimethoxysilane, and 4-(trimethoxysilylethyl)benzyltrimethylammonium chloride results in a Type I silica-based sorbent. The octadecyl and phenyl groups provide an enhanced hydrophobic micro-environment to promote interaction with hydrophobic species via non-polar forces.

FIG. 4A shows an example Type I silica-based sorbent. The quaternary amine [—$N^+(CH_3)_3$] is positively charged at a wide range of pH (0-12). Accordingly, Type I silica-based sorbents can form ionic bonds with negatively charged fluorescent dyes. For a fluorescein containing dye, at a pH greater than 6.5, the hydroxyl and carboxyl groups in the fluorescein structure are negatively charged. Accordingly, at a pH between about 6.5 and 12, the quaternary amine of the sorbent is positively charged and can form an ionic bond with a negatively charged functional group on the functionalized dye. The same functionalized dye can also form a hydrophobic bond with the hydrophobic region of the silica-based sorbent. Accordingly, the hydrophobic and ionic interactions work synergistically to attract the functionalized dyes. The sorbent can then be washed to remove any non-bound components of the oil phase. Subsequently, the sorbent with the bound functionalized dye can be placed in an organic solution. Lowering the pH of the solution, for example, lowering the pH to less than 2, results in a disruption of the ionic interaction and the functionalized dye can be desorbed from the silica-based sorbent and recovered.

Figure 4B:
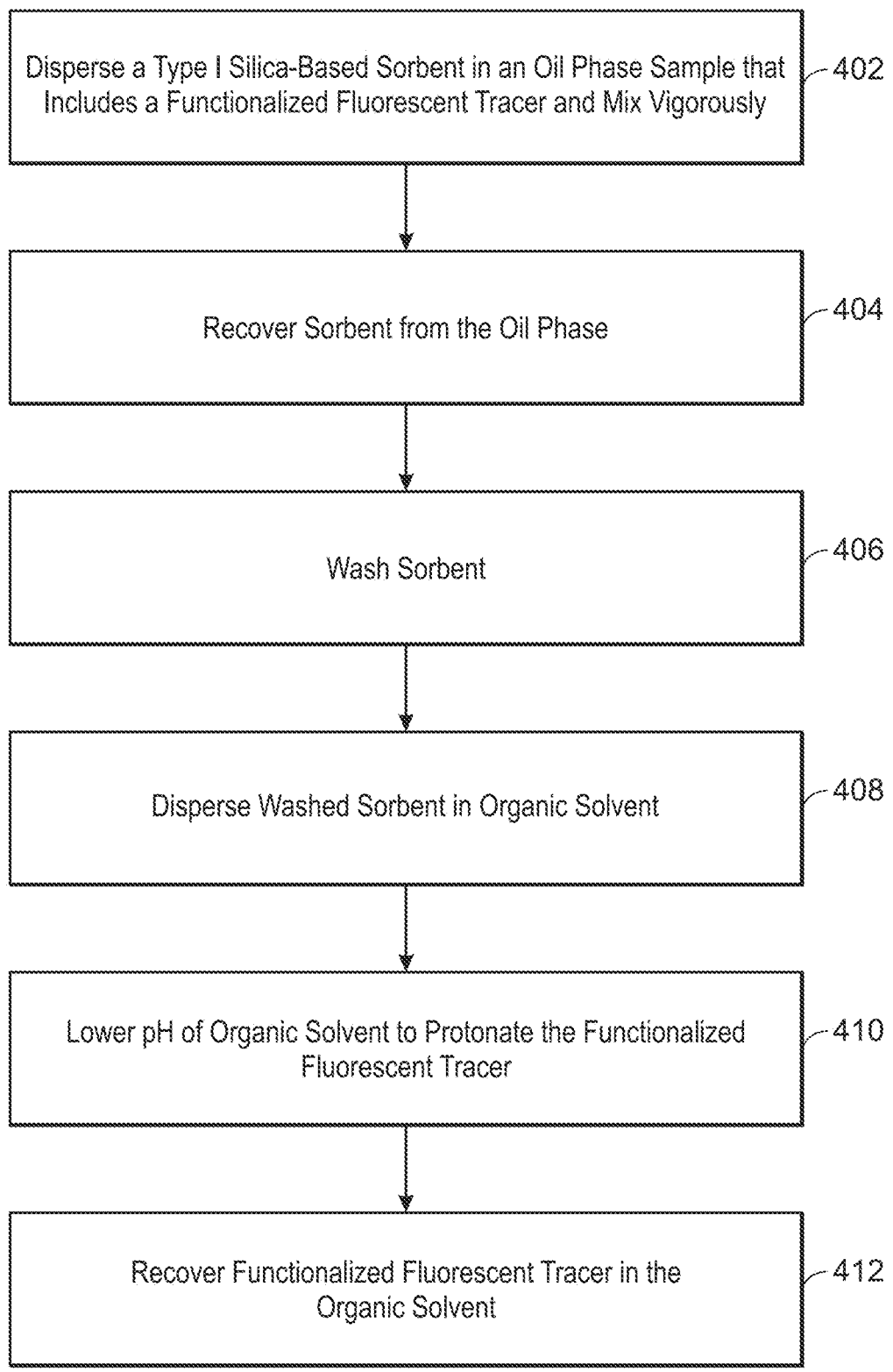
FIG. 4B is a flowchart of an example method of extracting a functionalized dye from an oil phase using a Type I silica-based sorbent.

FIG. 4B shows a flowchart of an example method 400 of extracting a functionalized dye from an oil phase using a Type I silica-based sorbent. At 402, a Type I silica-based sorbent is dispersed in an oil phase sample including a functionalized fluorescent tracer and mixed vigorously. At 404, the sorbent is recovered from the oil phase. In some implementations, the sorbent can be recovered by centrifugation. At 406, the sorbent can be washed to remove unbound materials. At 408, the washed sorbent is dispersed in an organic solvent. In some implementations, the organic solvent is methanol. At 410, the pH of the solvent is lowered to protonate the functionalized fluorescent tracer. In some implementations, the pH of the solution is lowered to less than 2. At 412, the functionalized fluorescent tracer can be recovered in the organic solvent. In some implementations, the functionalized fluorescent tracer is recovered from the organic solvent and analyzed. Alternatively, the functionalized fluorescent tracer can be analyzed in the organic solvent.

FIG. 5A shows an example of a "Type II" silica-based sorbent 200 and the mechanism of interaction with an example functionalized tracer dye. The Type II silica-based sorbent includes a silica base 202 and a hydrophobic region 204, for example, an alkyl chain [—$(CH_2)_n$—$CH_3$, n=7-17]. The Type II silica sorbent also includes strong acidic cation-exchange properties. In more detail, the silica-based sorbent includes a negatively charged functional group 206. In some implementations, the negatively charged group can be a sulfonic group.

Type II silica-based sorbents can be prepared by reacting tetraethyl orthosilicate with a hydrophobic-containing functional group and an ion-containing functional group. For example, the reaction of tetraethyl orthosilicate with n-octadecyltrimethoxysilane and 2-(4-chlorosulfonylphenyl)ethyltrimethoxysilane results in a Type II silica-based sorbent. The octadecyl and phenyl groups provide an enhanced hydrophobic micro-environment to promote interaction with hydrophobic species via non-polar forces.

FIG. 5A shows an example of a Type II silica-based sorbent. The sulfonic group (—$SO_3$) is negatively charged at a wide range of pH values (0-12). Accordingly, Type II silica-based sorbents can form ionic bonds with positively charged functionalized dyes. Rhodamine-containing dyes, for example the functionalized RBITC or TRITC dyes, are pronated and positively charged a pH less than 3.7 or 3.1. Accordingly, at an acidic pH of less than about 3, the sulfonic group of the sorbent is still negatively charged and can form an ionic bond with a positively charged functional group on the functionalized dye. The functionalized dye can also form a hydrophobic bond with the hydrophobic region of the silica-based sorbent. Accordingly, the hydrophobic and ionic interactions work synergistically to attract the functionalized dyes. The sorbent can then be washed to remove any non-bound components of the oil phase. Subsequently, the sorbent with the bound functionalized dye can be placed in an organic solution. Raising the pH of the solution above 2 results in a disruption of the ionic interaction and the functionalized dye can be desorbed from the silica-based sorbent and recovered.

Figure 5B:
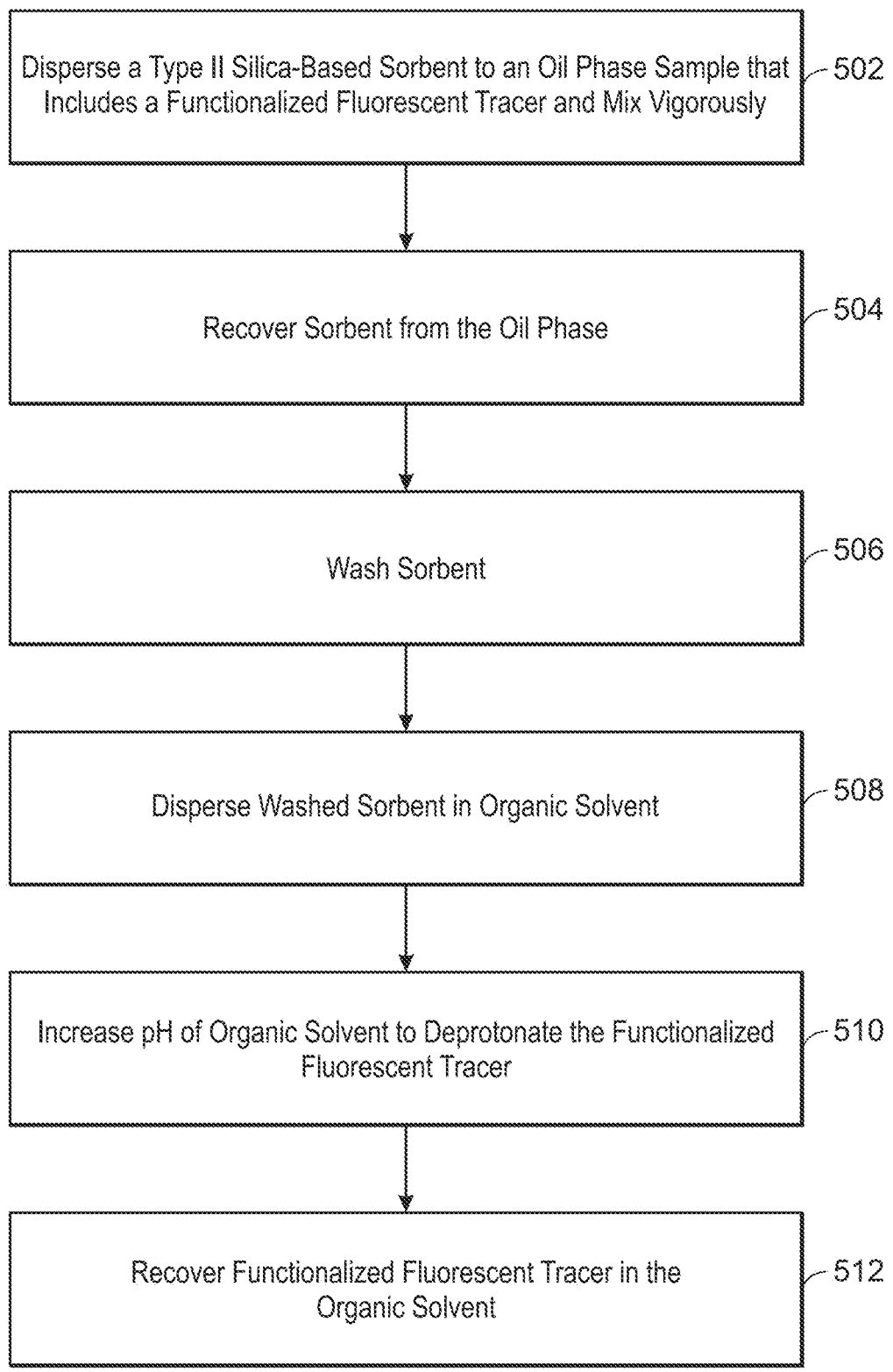
FIG. 5B is a flowchart of an example method of extracting a functionalized dye from an oil phase using a Type II silica-based sorbent.

FIG. 5B shows a flowchart of an example method 500 of extracting a functionalized dye from an oil phase using a Type II silica-based sorbent. At 502, a Type II silica-based sorbent is dispersed in an oil phase sample and mixed vigorously. The oil phase sample includes a functionalized fluorescent tracer. At 504, the sorbent is recovered from the oil phase. In some implementations, the sorbent is recovered with centrifugation. At 506, the sorbent is washed to remove unbound components from the oil phase. At 508, the sorbent is dispersed in an organic solvent. In some implementations, the organic solvent is methanol. At 510, the pH of the organic solvent is increased to deprotonate the functionalized fluorescent tracer. In some implementations, the pH is increased above 3. At 512, the functionalized fluorescent tracer is recovered in the organic solution. In some implementations, the functionalized fluorescent tracer is recovered from the organic solvent and analyzed. Alternatively, the functionalized fluorescent tracer can be analyzed in the organic solvent.

The tracers, sorbents, and extraction methods described herein have multiple applications in oilfield and drilling operations. For example, multistage hydraulic fracturing along a horizontal well is key to effectively recover hydrocarbons from tight reservoirs. Improving the hydrocarbon recovery requires detailed production information of each hydraulic fracture. Water-soluble chemical tracers are often used to calculate the production profile from multistage fracturing through a tracer flow back test, whereas oil-soluble tracers are used as a direct indicator to estimate the oil production contribution in individual fractures stages, for example, diagnosis of multi-zone oil flow efficiency, confirming zonal oil flow, or qualifying flow assurance. Oil-soluble tracers can also be embedded in the porous media and absorbed on the surfaces of solid carriers, which allows the tracers to be released from their carriers when oil passes through and has negligible partitioning into the water or gas phase.

In these example applications, the tracer molecules in collected field samples need to be qualitatively and quantitatively detected by instrumental methods to provide useful information. Most of the instrumental methods are unable to directly analyze tracer molecules in mixtures with crude oil. Therefore, the extraction methods described herein can help purify and preconcentrate the tracer compounds in clean solvents for further instrumental analyses.

Further, with the barcoded oil-soluble partition tracers described herein, qualitative analysis by fluorescence spectroscopy or imaging can be used for early screening if the tracer is in the oil flow from each stage, while detailed molecular barcode information can be revealed by HPLC, LC-MS, or Pyrolysis-GC-MS analysis to identify each of the tracers from different locations. Further, these synthesized barcoded oil-soluble compounds can also be added to mud formulations in drilling fluids as mud tracers for mud logging applications.

Figure 6:
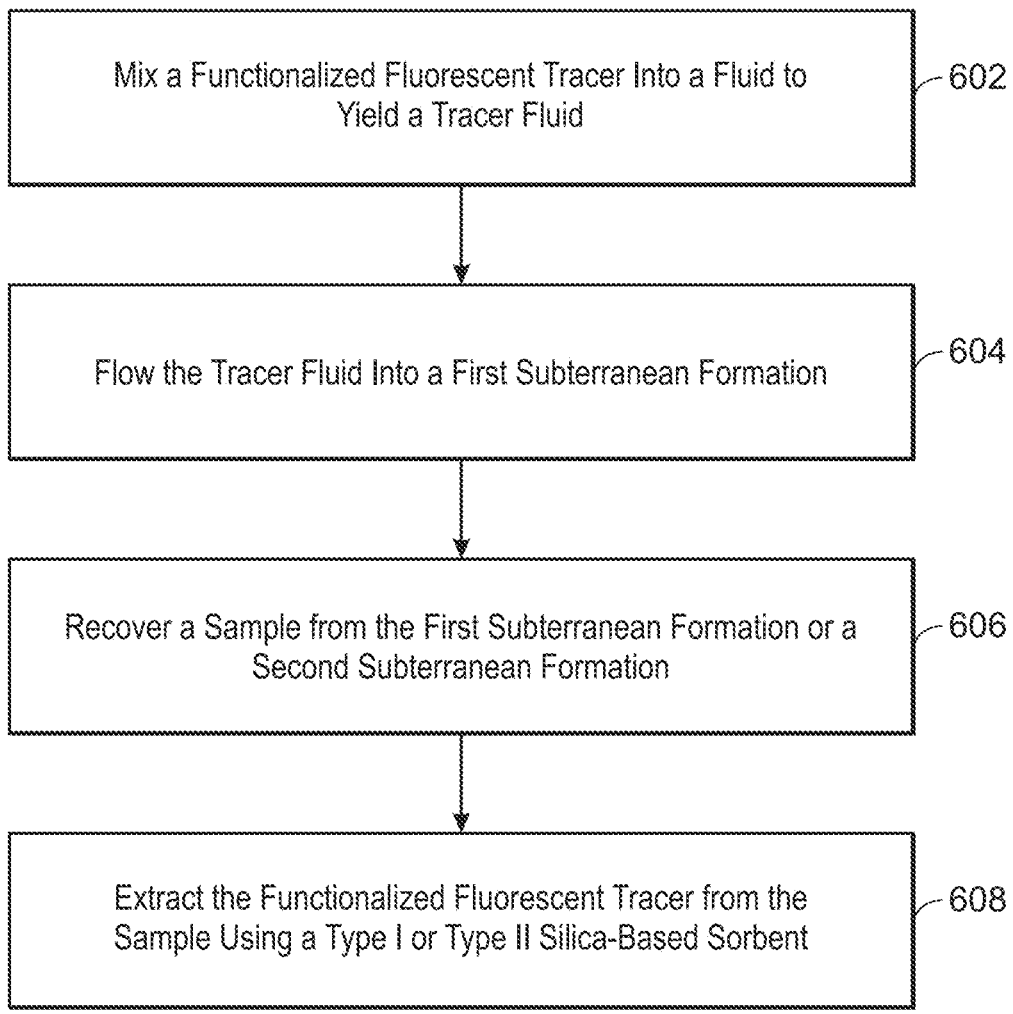
FIG. 6 a flow chart of an example method of tracing fluid flow in a subterranean formation.

FIG. 6 is a flow chart of an example method 600 of tracing fluid flow in a subterranean formation. At 602, a functionalized fluorescent tracer is mixed into a fluid to yield a tracer fluid. At 604, the tracer fluid is flowed into a first subterranean formation. At 606, a sample is recovered from the first subterranean formation or a second subterranean formation. In some implementations, the sample is analyzed for a fluorescent signal and only samples with fluorescence are selected for further analysis. At 608, the functionalized fluorescent tracer is extracted from the sample using a Type I or Type II silica-based sorbent.

Example 1: Strong Basic Anion-Exchange and Hydrophobic Functionalized Silica-Based Sorbent (Type I)

25 mL of tetraethyl orthosilicate (TEOS, ≥99.0%, Sigma-Aldrich) was dissolved in 55 mL of a solution of 1:1 by volume 95% ethanol and water. The solution was stirred vigorously, and 0.75 mL of 29.5% $NH_3 \cdot H_2O$ was added. After 1 hour, 2.0 mL of n-octadecyltrimethoxysilane (OTMS, 96%, Gelest) and 2.5 mL of 4-(trimethoxysilylethyl)benzyltrimethylammonium chloride (60% in methanol, Gelest) were added to the solution drop by drop, and the reaction mixture was continuously stirred for 6 hours. The reaction beaker was covered with aluminum foil. 5-6 holes were pierced in the foil using a needle. The reaction beakers was then transferred to an oven at kept at 60° C. for 60 hours. The resulting sorbent was separated by centrifugation, washed with ethanol, and dried at 150° C. in air overnight. The dried silica-based sorbent, functionalized with mixed octadecyl groups and benzyltrimethylammonium groups, was ground into a powder for sorbent applications.

For the Type I silica-based sorbent, the quaternary ammonium functional groups ($—N^+(CH_3)_3$) are positively charged at a wide range of pH (0-12) and can interact with anionic species via electrostatic attraction in solution. The octadecyl groups and phenyl groups provide an enhanced hydrophobic micro-environment to promote interaction with hydrophobic species via non-polar forces. The synergistic effect from both ionic and hydrophobic interactions enables the silica-based sorbent as an effective sorption material for oil-soluble tracers.

Figure 7A:
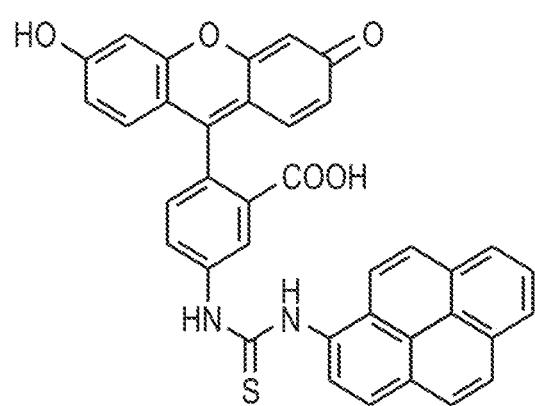
FIG. 7A shows the structure of FITC-pyrene.

For example, the Type I silica-based sorbent can separate $1 \times 10^{-3}$ M FITC-pyrene conjugated dye molecules from hexane. The structure of FITC-pyrene is shown in FIG. 7A. Compared to the highly water-soluble FITC dye, the structure modified FITC-pyrene dye is oil-soluble due to its enhanced hydrophobicity by the pyrenyl group. At basic conditions (pH >6.5) in a water phase, the hydroxyl and carboxyl groups in the fluorescein structure are negatively charged in the form of $—O^-$ and $—COO^-$ and can interact with the positively charged quaternary amine groups in the silica-based sorbent. In addition, the pyrenyl and phenyl groups in the structure-modified dye promote binding to the silica-based sorbent through hydrophobic interactions with the octadecyl and phenyl groups. The binding between the silica-based sorbent and the dye molecules is stable at basic pH. The sorbed dye can be separated from a liquid phase and washed with dilute $NH_3 \cdot H_2O$ solution. The sorbed dye can then be released into an organic solvent, for example, methanol, when the pH of the surrounding solution is altered to an acidic state, for example, a pH<2. At an acidic pH, the carbonyl group in the fluorescein dye becomes protonated and positively charged, resulting in an electrostatic repulsion between the dye molecule and the silica-based sorbent. The purified and preconcentrated oil-soluble dye can then be redispersed into different solvents for further instrumental analysis.

Figure 7B:
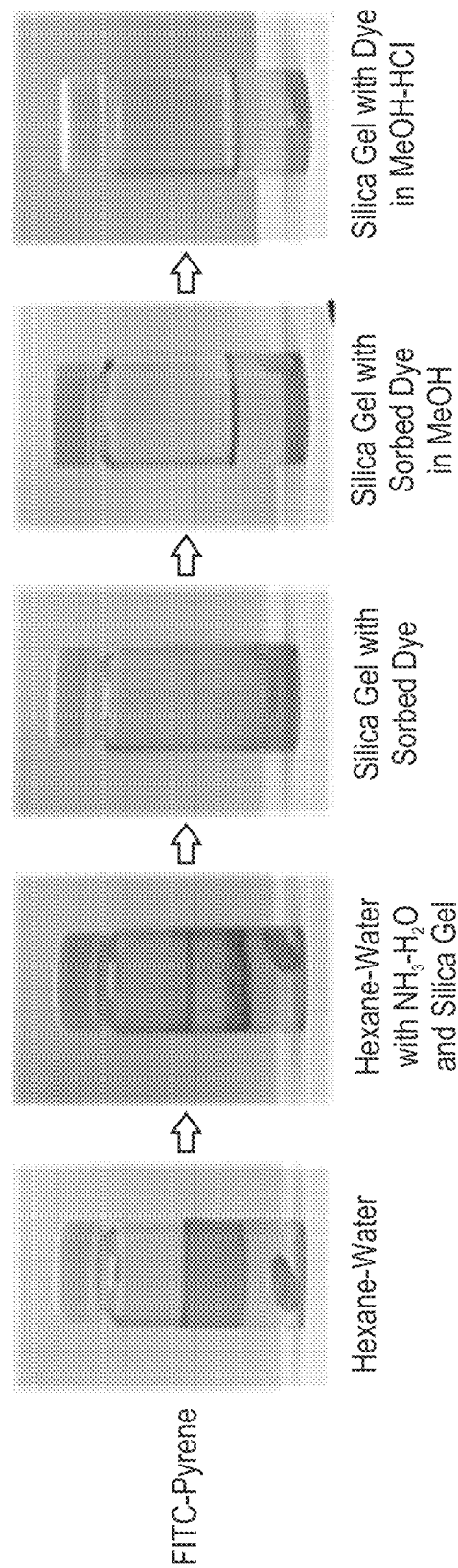
FIG. 7B shows an example of the oil-soluble dye FITC-pyrene at each step during its extraction from an oil phase with Type I functionalized sorbent.

FIG. 7B shows an example of the oil-soluble dye FITC-pyrene at each step during its extraction from an oil phase with Type I functionalized sorbent. From left to right, FITC-pyrene is present in a mixture of hexane and water, where the dye is partitioned in the hexane layer. After the addition of a dilute $NH_3 \cdot H_2O$ solution and Type I silica-based sorbent, the FITC-pyrene dye is sorbed to the silica-based sorbent. After separating the silica-based sorbent, the sorbent is washed with methanol. When the surrounding solution is acidic due to the addition of HCl, the dye dissociates from the silica-based sorbent, and the dye can be recovered or analyzed in the methanol phase.

Example 2: Strong Acidic Cation-Exchange and Hydrophobic Functionalized Silica-Based Sorbent (Type II)

25 mL of tetraethyl orthosilicate (TEOS, ≥99.0%, Sigma-Aldrich) was dissolved in 55 mL of a 1:1 by volume mixture of 95% ethanol and water in a beaker under vigorous stirring. 0.2 mL of concentrated HCl (12 M) was added. After two hours, 2.0 mL of n-octadecyltrimethoxysilane (OTMS, 97%, Gelest) and 2.5 mL of 2-(4-chlorosulfonylphenyl)ethyltrimethoxysilane (50% in methylene chloride, Gelest) were added to the solution, drop by drop, and the reaction mixture was continuously stirred for 6 hours. The beaker was covered with aluminum foil and 5-6 holes were pierced in the foil using a needle. The beaker was then transferred to an oven and kept at 60° C. for 60 hours. The formed sorbent was then separated by centrifugation, washed with ethanol, and dried at 150° C. in air overnight. The dried silica-based sorbent, functionalized with octadecyl and phenylsulfonic groups, was ground into a powder for sorbent applications.

In the Type II silica-based sorbent, the sulfonic groups (—$SO_3^-$) are negatively charged in a wide range of pH (0-12) and can interact with cationic species via electrostatic attraction. The octadecyl and phenyl groups also provide an enhanced hydrophobic micro-environment that can interact with hydrophobic species in solution via non-polar interactions. The synergistic effect from both ionic and hydrophobic interactions enables the silica-based sorbent to be an efficient sorption material for oil-soluble tracers.

Figure 8A:
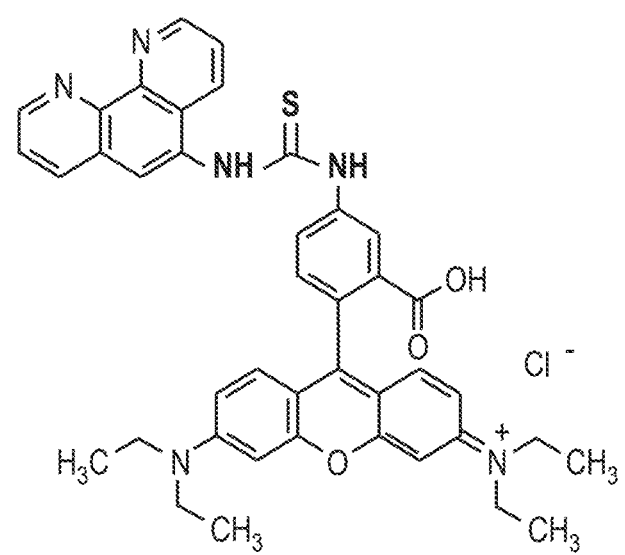
FIG. 8A shows the structure of RBITC-phen.

For example, the separation of $1 \times 10^{-3}$ M RBITC-phenanthroline conjugated dye molecules (RBITC-phen) can be extracted from hexane. The structure of RBITC-phen is shown in FIG. 8A. Compared to the highly water-soluble RBITC dye, the structure-modified RBITC-phen dye is oil-soluble to the enhanced hydrophobicity of its phenanthroline group. At pH<2 in a water phase, the Rhodamine group is protonated and is positively charged. Accordingly, the structure-modified dye can interact electrostatically with the negatively charged sulfonic groups in the silica-based sorbent. The phenanthroline, phenyl, and —COOH groups in the dye molecules can interact with the octadecyl and phenyl groups in the silica-based sorbent. The binding between the silica-based sorbent sorption materials and the dye molecules are stable at acidic pH. The sorbent with the sorbed dye can be separated and washed with dilute acidic solution, for example dilute HCl solution. The sorbed dyes can then be released into an organic solvent, for example methanol, through electrostatic repulsion by adjusting the pH value to a basic pH. At a basic pH, the positively charged —$N^+(C_2H_2)_2$ group in the dye becomes neutral, and the —COOH group in the dye becomes a negatively charged —$COO^-$ group.

Figure 8B:
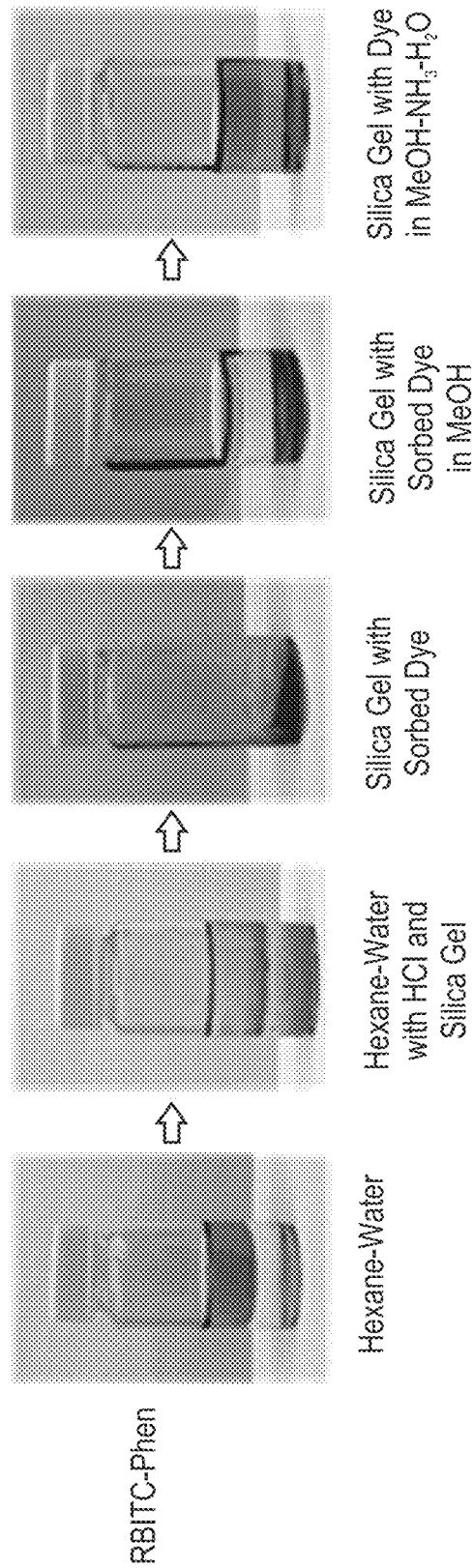
FIG. 8B an example of the oil-soluble dye RBITC-phen at each step during its extraction from an oil phase by Type II functionalized sorbent.

FIG. 8B shows an example of the oil-soluble dye RBITC-phen at each step during its extraction from an oil phase by Type II functionalized sorbent. From left to right, RBITC-phen is present in a mixture of hexane and water, where the dye is partitioned in the hexane layer. After the addition of dilute HCl and Type II silica-based sorbent, the RBITC-phen dye is sorbed to the silica-based sorbent. After separating the silica-based sorbent, the sorbent is washed with methanol. When the surrounding solution is basic due to the addition of $NH_3 \cdot H_2O$, the dye dissociates from the silica-based sorbent.

Example 3: Separation of Oil-Soluble Dyes from Crude Oil

Figure 9A:
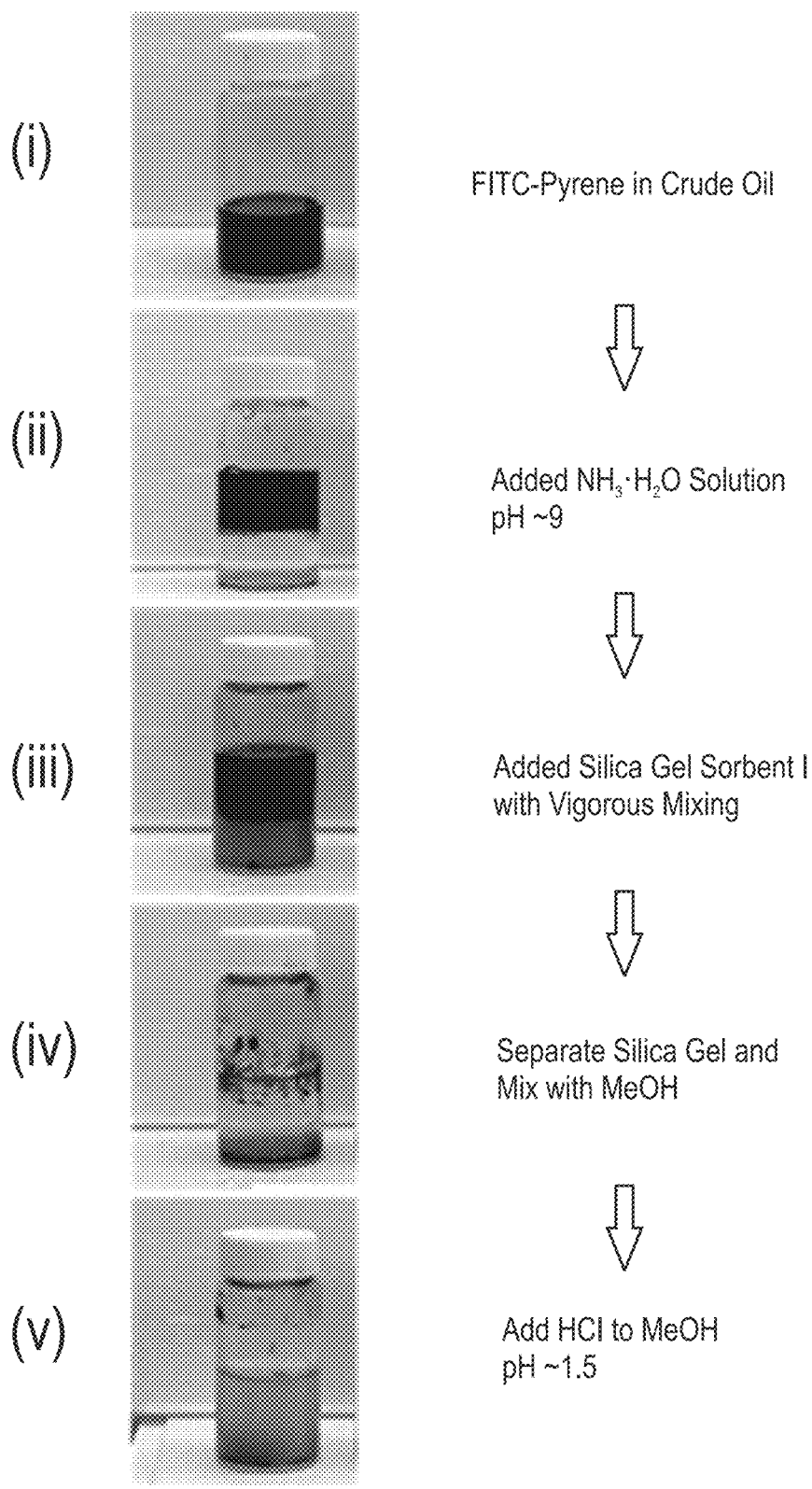
FIG. 9A shows an example extraction of FITC-pyrene from crude oil.

Crude oil is a mixture of liquid hydrocarbons with complex components including paraffins, naphthenes, and aromatics. Therefore, it can be very challenging to separate dye tracer molecules from crude oil As shown in this example, the functionalized dyes described herein can be extracted from crude oil using the functionalized silica Type I and Type II silica-based sorbents. FIG. 9A shows an example extraction of FITC-pyrene from crude oil. At step (i), FITC-Pyrene is present in Texas middle light crude oil at a concentration of $1 \times 10^{-3}$ M. At step (ii), an $NH_3 \cdot H_2O$ solution is added to adjust the pH to about 9. At step (iii), Type I silica-based sorbent is added to the mixture and mixed vigorously. At step (iv), the silica-based sorbent is separated from the crude oil via centrifugation and washed with methanol. At step (v), HCl is added to the methanol mixture to adjust the pH to about 1.5. The yellow-colored FITC-pyrene can be seen in the final methanol mixture. Although some crude oil components are also sorbed onto the silica-based sorbent, these components are typically non-charged. Therefore, by manipulating the pH values to enhance the ionic repulsive forces between the sorbed components and the functionalized silica-based sorbent, the organic dye molecules can be selectively released into the methanol-water mixture.

Figure 9B:
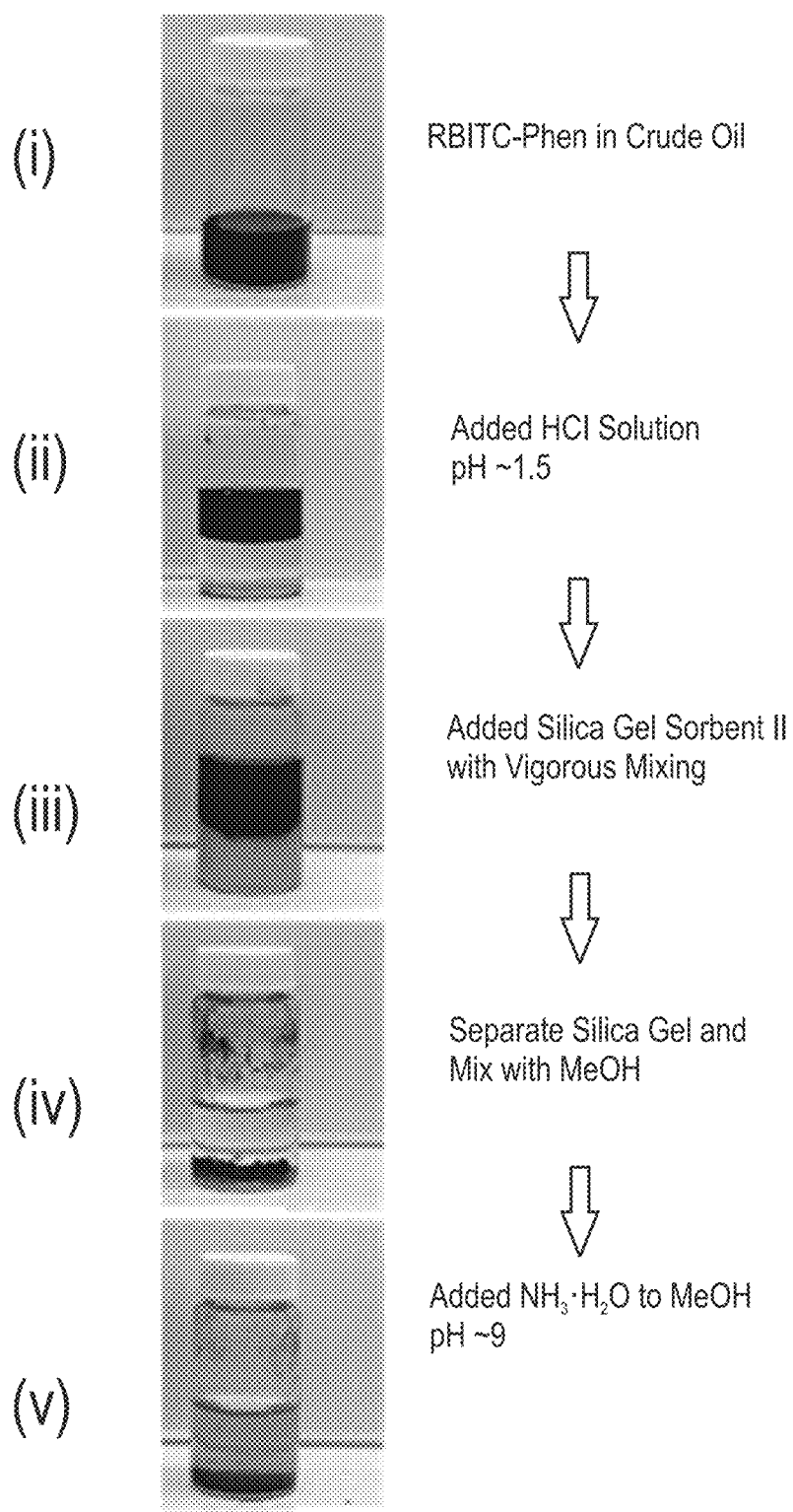
FIG. 9B shows an example extraction of RBITC-phen dyes from crude oil.

FIG. 9B shows an example extraction of the red-colored RBITC-phen dyes from crude oil. At step (i), RBITC-phen is present in Texas middle light crude oil at a concentration of $1 \times 10^{-3}$ M. At step (ii), HCl is added to the mixture to adjust the pH to about 1.5. At step (iii), Type II silica-based sorbent is added to the mixture and mixed vigorously. At step (iv), the silica-based sorbent is separated from the crude oil via centrifugation and washed with methanol. At step (v), $NH_3 \cdot H_2O$ is added to adjust the pH to about 9. The red-colored RBITC-phen dye can be seen in the final methanol mixture. Similarly to the Type I silica extraction, some crude oil component are also sorbed onto the silica-based sorbent, however, manipulating the pH values enhances the ionic repulsive forces between the sorbed components and the functionalized silica-based sorbent, allowing the organic dye molecules to be selectively released into the methanol-water mixture.

The following units of measure have been mentioned in this disclosure:

| Unit of Measure | Full form |
| --- | --- |
| Da | Dalton |
| nm | nanometer |
| mL | milliliter |
| ° C. | degrees Celsius |
| M | Molar, moles/liter |

In some implementations, a sorbent for extracting tracer molecules from a fluid includes a silica-based sorbent. The silica-based sorbent includes a hydrophobic functional group and an ionic functional group. The ionic functional group is positively charged.

This aspect, taken alone or combinable with any other aspect, can include the following features. The hydrophobic functional group includes an alkyl chain with the formula —$(CH_2)_n$—$CH_3$, wherein n is 7-17.

This aspect, taken alone or combinable with any other aspect, can include the following features. The hydrophobic functional group includes an octadecyl alkyl chain.

This aspect, taken alone or combinable with any other aspect, can include the following features. The ionic functional group is positively charged between a pH of 0 and a pH of 12.

This aspect, taken alone or combinable with any other aspect, can include the following features. The ionic functional group includes a quaternary amine.

This aspect, taken alone or combinable with any other aspect, can include the following features. The ionic functional group includes a benzyl trimethyl ammonium group.

In some implementations, a sorbent for extracting tracer molecules from a fluid includes a silica-based sorbent. The silica-based sorbent includes a hydrophobic functional group and an ionic functional group. The ionic functional group is negatively charged.

This aspect, taken alone or combinable with any other aspect, can include the following features. The hydrophobic functional group includes an alkyl chain with the formula —$(CH_2)_n$—$CH_3$, wherein n is 7-17.

This aspect, taken alone or combinable with any other aspect, can include the following features. The hydrophobic functional group includes an octadecyl alkyl chain.

This aspect, taken alone or combinable with any other aspect, can include the following features. The ionic functional group is negatively charged between a pH of 0 and a pH of 12.

This aspect, taken alone or combinable with any other aspect, can include the following features. The ionic functional group includes a sulfonic functional group.

This aspect, taken alone or combinable with any other aspect, can include the following features. The ionic functional group includes a sulfonylphenyl functional group.

In some implementations, a method of extracting a functionalized dye from an oil phase includes dispersing a Type I silica-based sorbent in an oil phase sample that includes a functionalized fluorescent tracer. The functionalized fluorescent tracer includes a fluorescent dye and a hydrophobic functional group. The Type I silica-base sorbent includes a hydrophobic functional group and an ionic functional group. The ionic functional group is positively charged. The method includes mixing the oil phase sample and Type I silica-based sorbent, recovering the sorbent from the oil phase, washing the sorbent, dispersing the washed sorbent in an organic solvent, lowering the pH of the organic solvent to protonate the functionalized fluorescent tracer, and recovering the functionalized fluorescent tracer in the organic solvent.

This aspect, taken alone or combinable with any other aspect, can include the following features. Recovering the sorbent from the oil phase includes separating the sorbent from the oil phase by centrifugation.

This aspect, taken alone or combinable with any other aspect, can include the following features. The organic solvent is methanol.

This aspect, taken alone or combinable with any other aspect, can include the following features. The ionic functional group includes a quaternary amine.

This aspect, taken alone or combinable with any other aspect, can include the following features. Lowering the pH of the organic solvent to protonate the functionalized fluorescent tracer includes lowering the pH to less than 2.

In some implementations, a method of extracting a functionalized dye from an oil phase includes dispersing a Type II silica-based sorbent in an oil phase sample that includes a functionalized fluorescent tracer. The functionalized fluorescent tracer includes a fluorescent dye and a hydrophobic functional group. The Type II silica-base sorbent includes a hydrophobic functional group and an ionic functional group. The ionic functional group is negatively charged. The method includes mixing the oil phase sample and Type II silica-based sorbent, recovering the sorbent from the oil phase, washing the sorbent, dispersing the washed sorbent in an organic solvent, raising the pH of the organic solvent to deprotonate the functionalized fluorescent tracer, and recovering the functionalized fluorescent tracer in the organic solvent.

This aspect, taken alone or combinable with any other aspect, can include the following features. Recovering the sorbent from the oil phase includes separating the sorbent from the oil phase by centrifugation.

This aspect, taken alone or combinable with any other aspect, can include the following features. The organic solvent is methanol.

This aspect, taken alone or combinable with any other aspect, can include the following features. The ionic functional group includes a sulfonic functional group.

This aspect, taken alone or combinable with any other aspect, can include the following features. Raising the pH of the organic solvent to protonate the functionalized fluorescent tracer includes raising the pH to greater than 3.

In some implementations, a method of tracing fluid flow in a subterranean formation includes mixing a functionalized fluorescent tracer into a fluid to yield a tracer fluid. The functionalized fluorescent tracer includes a fluorescent dye and a hydrophobic functional group, The method includes flowing the tracer fluid into a first subterranean formation, recovering a sample from the first subterranean formation or a second subterranean formation, and extracting the functionalized fluorescent tracer from the sample using a Type I or Type II silica-based sorbent. The Type I silica-based sorbent includes a hydrophobic functional group and an ionic functional group. The ionic functional group is positively charged. The Type II silica-based sorbent includes a hydrophobic functional group and an ionic functional group. The ionic functional group is negatively charged.

This aspect, taken alone or combinable with any other aspect, can include the following features. The Type I silica-based sorbent includes an alkyl chain with the formula —$(CH_2)_n$—$CH_3$, wherein n is 7-17.

This aspect, taken alone or combinable with any other aspect, can include the following features. The Type I silica-based sorbent includes an octadecyl alkyl chain.

This aspect, taken alone or combinable with any other aspect, can include the following features. The Type II silica-based sorbent includes an alkyl chain with the formula —$(CH_2)_n$—$CH_3$, wherein n is 7-17.

This aspect, taken alone or combinable with any other aspect, can include the following features. The Type II silica-based sorbent includes an octadecyl alkyl chain.

This aspect, taken alone or combinable with any other aspect, can include the following features. The Type I silica-based sorbent includes an ionic functional group, wherein the ionic functional group is positively charged between a pH of 0 and a pH of 12.

This aspect, taken alone or combinable with any other aspect, can include the following features. The ionic functional group includes a quaternary amine.

This aspect, taken alone or combinable with any other aspect, can include the following features. The ionic functional group includes a benzyl trimethyl ammonium group.

This aspect, taken alone or combinable with any other aspect, can include the following features. The Type II silica-based sorbent includes an ionic functional group, wherein the ionic functional group is negatively charged between a pH of 0 and a pH of 12.

This aspect, taken alone or combinable with any other aspect, can include the following features. The ionic functional group includes a sulfonic functional group.

This aspect, taken alone or combinable with any other aspect, can include the following features. The ionic functional group includes a sulfonylphenyl functional group.

This aspect, taken alone or combinable with any other aspect, can include the following features. The method further includes analyzing the recovered sample for a fluorescence signal before extracting the fluorescent tracer from the sample using a Type I or Type II silica-based sorbent.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "fluid" refers to liquids and gels, unless otherwise indicated.

As used in this disclosure, the term "subterranean material," "subterranean formation," or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some implementations, a flow pathway can be a water source and can include water. In some implementations, a flow pathway can be a petroleum source and can include petroleum. In some implementations, a flow pathway can be sufficient to divert water, a downhole fluid, or a produced hydrocarbon from a wellbore, fracture, or flow pathway connected to the pathway.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

What is claimed is:

1. A method of tracing fluid flow in a subterranean formation, comprising:
    mixing a functionalized fluorescent tracer into a fluid to yield a tracer fluid, wherein the functionalized fluorescent tracer comprises a fluorescent dye and a hydrophobic functional group;
    flowing the tracer fluid into a first subterranean formation;
    recovering a sample from the first subterranean formation or a second subterranean formation; and
    extracting the functionalized fluorescent tracer from the sample using a Type I or Type II silica-based sorbent, wherein
        the Type I silica-based sorbent comprises a hydrophobic functional group and an ionic functional group, wherein the ionic functional group is positively charged, and
        the Type II silica-based sorbent comprises a hydrophobic functional group and an ionic functional group, wherein the ionic functional group is negatively charged.

2. The method of claim 1, wherein the Type I silica-based sorbent comprises an alkyl chain with the formula $-(CH_2)_n-CH_3$, wherein n is 7-17.

3. The method of claim 1, wherein the Type I silica-based sorbent comprises an octadecyl alkyl chain.

4. The method of claim 1, wherein the Type II silica-based sorbent comprises an alkyl chain with the formula $-(CH_2)_n-CH_3$, wherein n is 7-17.

5. The method of claim 1, wherein the Type II silica-based sorbent comprises an octadecyl alkyl chain.

6. The method of claim 1, wherein the Type I silica-based sorbent comprises an ionic functional group, wherein the ionic functional group is positively charged between a pH of 0 and a pH of 12.

7. The method of claim 6, wherein the ionic functional group comprises a quaternary amine.

8. The method of claim 7, wherein the ionic functional group comprises a benzyl trimethyl ammonium group.

9. The method of claim 1, wherein the Type II silica-based sorbent comprises an ionic functional group, wherein the ionic functional group is negatively charged between a pH of 0 and a pH of 12.

10. The method of claim 9, wherein the ionic functional group comprises a sulfonic functional group.

11. The method of claim 10, wherein the ionic functional group comprises a sulfonylphenyl functional group.

12. The method of claim 1, further comprising analyzing the recovered sample for a fluorescence signal before extracting the fluorescent tracer from the sample using a Type I or Type II silica-based sorbent.

* * * * *